US006713187B2

(12) United States Patent
Shigesato et al.

(10) Patent No.: US 6,713,187 B2
(45) Date of Patent: Mar. 30, 2004

(54) GRAIN-ORIENTED SILICON STEEL SHEET EXCELLENT IN ADHESIVENESS TO TENSION-CREATING INSULATING COATING FILMS AND METHOD FOR PRODUCING THE SAME

(75) Inventors: Genichi Shigesato, Futtsu (JP); Hiroyasu Fujii, Kitakyushu (JP); Kenichi Murakami, Kitakyushu (JP); Yoshiyuki Ushigami, Futtsu (JP); Shuichi Nakamura, Futtsu (JP); Masaaki Sugiyama, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/312,643

(22) PCT Filed: Apr. 23, 2002

(86) PCT No.: PCT/JP02/04052

§ 371 (c)(1),
(2), (4) Date: Dec. 23, 2002

(87) PCT Pub. No.: WO02/088424

PCT Pub. Date: Nov. 7, 2002

(65) Prior Publication Data

US 2003/0180553 A1 Sep. 25, 2003

(30) Foreign Application Priority Data

Apr. 23, 2001 (JP) ....................................... 2001-124473
May 22, 2001 (JP) ....................................... 2001-152756
Jun. 8, 2001 (JP) ....................................... 2001-174669

(51) Int. Cl.[7] ............................ B32B 15/04; B05D 3/00

(52) U.S. Cl. ....................... 428/469; 148/516; 148/537; 427/327; 427/330; 427/397.7; 428/450; 428/702

(58) Field of Search ................................ 428/469, 450, 428/702; 427/327, 330, 397.7; 148/110, 516, 537

(56) References Cited

FOREIGN PATENT DOCUMENTS

| | | |
|---|---|---|
| JP | 4-165082 | 6/1992 |
| JP | 5-279747 | 10/1993 |
| JP | WO 93/23577 | 11/1993 |

*Primary Examiner*—Robert R. Koehler
(74) *Attorney, Agent, or Firm*—Kenyon & Kenyon

(57) ABSTRACT

The present invention provides a grain-oriented silicon steel sheet excellent in adhesiveness to tension-creating insulating coating films formed on the grain-oriented silicon steel sheet produced by removing inorganic mineral films composed of forsterite and so on with pickling or the like or by deliberately preventing the formation thereof, characterized by: having, at the interface between each of the tension-creating insulating coating films and the steel sheet, an external oxidation type membranous oxide film of 2 to 500 nm in average thickness mainly composed of amorphous silica and/or a mixed oxide film consisting of an external oxidation type membranous oxide film of 2 to 500 nm in average thickness mainly composed of amorphous silica and particulate oxides mainly composed of amorphous silica: and satisfying any one or more of the specified requirements.

4 Claims, 4 Drawing Sheets

GRAIN-ORIENTED SILICON STEEL SHEET EXCELLENT IN ADHESIVENESS TO TENSION-CREATING INSULATING COATING FILMS AND METHOD FOR PRODUCING THE SAME

TECHNICAL FIELD

The present invention relates to a grain-oriented silicon steel sheet produced by forming tension-creating insulating coating films on a final annealed grain-oriented silicon steel sheet prepared by deliberately preventing the formation of inorganic mineral films composed of forsterite ($Mg_2SiO_4$) and so on and, further, smoothing the surfaces to the extent of showing specular gloss, and a method for producing the steel sheet.

BACKGROUND ART

A grain-oriented silicon steel sheet is widely used as a material for magnet cores and, for minimizing energy loss in particular, a silicon steel sheet having a small core loss is required. It is effective to impose a tension on a steel sheet to reduce core loss. For this reason, it has been a common practice to create a tension in a steel sheet and to reduce a core loss by forming coating films consisting of a material having a smaller thermal expansion coefficient than that of the steel sheet at a high temperature. A film of a forsterite type formed through the reaction of oxides, on a steel sheet surface, with an annealing separator in a final annealing process creates a tension in the steel sheet, and the adhesiveness of the film is excellent.

Japanese Unexamined Patent Publication No. S48-39338 discloses that the formation of insulating coating films by coating the surfaces of a steel sheet with a coating liquid mainly consisting of colloidal silica and phosphate and baking it has a significant effect on creating a tension in the steel sheet and is effective in reducing the core loss.

Therefore, the method of keeping the films of a forsterite type formed in a final annealing process and then forming insulating coating films mainly consisting of phosphate is generally employed as a method for producing a grain-oriented silicon steel sheet.

In recent years, it has been clarified that the disordered interfacial structure of a forsterite type film and a base metal somewhat reduces the effect of a coating film tension on improving a core loss. In view of this, a technology has been developed which attempts to further reduce a core loss by forming anew tension-creating coating films after removing the forsterite type films formed in a final annealing process and/or applying a mirror-finish further, as disclosed in Japanese Unexamined Patent Publication No. S49-96920, for example.

However, although said insulating coating film has an appreciable adhesiveness when it is formed on a film mainly composed of forsterite, it has an insufficient adhesiveness when it is formed after removing a forsterite type film or when a forsterite type film is intentionally prevented from forming in a final annealing process. When a forsterite type coating film is removed, in particular, it is necessary to secure a desired tension only with a tension-creating insulating coating film formed by coating a steel sheet surface with a coating liquid, and, therefore, it is necessary to make the insulating coating film thicker and a stronger adhesiveness is required. For this reason, by a conventional method of forming a coating film, it has been difficult to realize a coating film-induced tension high enough for making the best of the mirror finishing of a steel sheet surface and, at the same time, to secure the high adhesiveness of the coating film and, consequently, the core loss has not been reduced sufficiently. In view of this situation, the methods of forming oxide films on the surfaces of a final annealed grain-oriented silicon steel sheet prior to the formation of the tension-creating insulating coating films were disclosed, for example, in Japanese Unexamined Patent Publication Nos. S60-131976, H6-184762, H7-278833, H8-191010 and H9-078252, as the technologies for securing the adhesiveness of the tension-creating insulating coating films.

The method disclosed in Japanese Unexamined Patent Publication No. S60-131976 is a method of internally oxidizing the vicinity of the surfaces of a final annealed grain-oriented silicon steel sheet after mirror-finishing the steel sheet, for the purpose of improving the adhesiveness of the tension-creating coating films by the internally oxidized layers and, thus, compensating for the deterioration of the core loss resulting from the internal oxidation, namely the deterioration of specular gloss, with the increase in the tension brought about by the improved adhesiveness of the coating films.

The method disclosed in Japanese Unexamined Patent Publication No. H6-184762 is a method of securing the adhesiveness between each of tension-creating insulating coating films and a steel sheet by the effect of external oxidation type oxide films formed on the steel sheet surfaces by subjecting a final annealed grain-oriented silicon steel sheet conditioned into a mirror finish or the like to annealing in a prescribed atmosphere at each of the prescribed temperatures.

The technology disclosed in Japanese Unexamined Patent Publication No. H7-278833 is a technology for preventing the oxidation of a steel sheet, namely the deterioration of specular gloss, from occurring during the formation of crystalline tension-creating insulating coating films, when the tension-creating insulating coating films are in a crystalline state, by forming basic coating films composed of amorphous oxides beforehand on the surfaces of a final annealed grain-oriented silicon steel sheet free of inorganic mineral films. The method disclosed in Japanese Unexamined Patent Publication No. H8-191010 is a method of reducing a core loss by forming crystalline fayalite on the surfaces of a final annealed grain-oriented silicon steel sheet cleaned of non-metallic substances and utilizing the tension-creating and adhesiveness-improving effects of the fayalite crystals. The method disclosed in Japanese Unexamined Patent Publication No. H9-078252 is a method of securing the adhesiveness of tension-creating coating films and, at the same time, realizing a good core loss by controlling the amount of basic silica layers formed on the surfaces of a finish-annealed grain-oriented silicon steel sheet free of inorganic mineral films to 100 $mg/m^2$ or less.

DISCLOSURE OF THE INVENTION

However, while it has been possible to realize the effects of improving the adhesiveness of coating films and reducing a core loss to an appreciable extent by forming oxide films on the surfaces of a grain-oriented silicon steel sheet free of an inorganic materials through the application of said technologies, the adhesiveness of the tension-creating insulating coating films has not been perfectly satisfactory. The present invention, which solves the above problems, is a method of forming tension-creating insulating coating films having a sufficient adhesiveness to a final annealed grain-oriented silicon steel sheet free of inorganic mineral coating films.

The gist of the present invention is as follows:

(1) A grain-oriented silicon steel sheet excellent in adhesiveness to tension-creating insulating coating films formed on the grain-oriented silicon steel sheet produced by removing inorganic mineral films composed of forsterite, and so on, by pickling or the like or by deliberately preventing the formation thereof, characterized by: having, at the interface between each of the tension-creating insulating coating films and the steel sheet, an external oxidation type membranous oxide film of 2 to 500 nm in average thickness mainly composed of amorphous silica and/or a mixed oxide film consisting of an external oxidation type membranous oxide film of 2 to 500 nm in average thickness mainly composed of amorphous silica and particulate oxides mainly composed of amorphous silica: and satisfying any one or more of the following requirements A to E;

A. that the percentage of said particulate oxides to said membranous oxide film is 2% or more in terms of area percentage at a cross-section;

B. that the percentage of oxides composed of one or more elements selected from among Fe, Al, Ti, Mn and Cr in said membranous oxide film is 50% or less in terms of area percentage at a cross-section;

C. that the percentage in voids to said membranous oxide film is 30% or less in terms of area percentage at a cross-section;

D. that the percentage of metallic iron in said membranous oxide film is 30% or less in terms of area percentage at a cross-section; and E. that the average thickness of low-density layers is 30% or less of the total thickness of said membranous oxide film when they are evaluated in terms of the ratio between elastic scattering strength and inelastic scattering strength measured by electron energy loss spectroscopy.

(2) A grain-oriented silicon steel sheet excellent in adhesiveness to tension-creating insulating coating films according to the (1), characterized in that the tension-creating insulating coating films are the coating films formed by baking an application liquid mainly composed of phosphate and colloidal silica and/or an application liquid mainly composed of alumina sol and boric acid.

(3) A method for producing a grain-oriented silicon steel sheet excellent in adhesiveness to tension-creating insulating coating films formed by, in advance of the formation of the tension-creating insulating coating films: annealing a final annealed grain-oriented silicon steel sheet produced by removing the inorganic mineral coating films composed of forsterite, and so on, by pickling or the like or by deliberately preventing the formation thereof in a low-oxidizing atmosphere to form oxides on the surfaces thereof; then applying a liquid for forming the tension-creating insulating coating films; and baking the application liquid: characterized by satisfying any one or more of the following requirements A to E:

A. to form particulate oxides mainly composed of amorphous silica in addition to external oxidation type membranous oxide films of 2 to 500 nm in average thickness mainly composed of amorphous silica by imposing micro-strains and/or forming micro-roughnesses on the surfaces of the steel sheet prior to the annealing in a low-oxidizing atmosphere for forming the oxides, and then annealing the steel sheet in a low-oxidizing atmosphere at a temperature from 600 to 1,150° C.;

B. to control the percentage of oxides composed of one or more elements selected from among Fe, Al, Ti, Mn and Cr in the external oxidation type oxide films mainly composed of amorphous silica to 50% or less in terms of area percentage at a section by controlling the heating rate to 10 to 500° C./sec. in a heating temperature range from 200 to 1,150° C., during the annealing process in a low-oxidizing atmosphere for forming the external oxidation type membranous oxide films and the particulate oxides;

C. to control the percentage of voids in the external oxidation type oxide films mainly composed of amorphous silica to 30% or less in terms of area percentage at a section by controlling the cooling rate to 100° C./sec. or less in a cooling temperature range from 1,150 to 200° C., during the annealing process in a low-oxidizing atmosphere for forming the external oxidation type oxide films and the particulate oxides;

D. to control the percentage of metallic iron in the external oxidation type oxide films mainly composed of amorphous silica to 30% or less in terms of area percentage at a section by controlling the dew point of the cooling atmosphere to 60° C. or lower in a cooling temperature range from 1,150 to 200° C., during the annealing process in a low-oxidizing atmosphere for forming the external oxidation type oxide films and the particulate oxides; and E. to control the average thickness of low-density layers to 30% or less of the total thickness of the external oxidation type oxide films mainly composed of amorphous silica, when they are evaluated in terms of the ratio between elastic scattering strength and inelastic scattering strength measured by electron energy loss spectroscopy, by controlling the time during which the application liquid for forming the tension-creating insulating coating films and the steel sheet with the amorphous silica contact each other to 20 sec. or less, in the temperature range of 100° C. or lower, in the method of forming the tension-creating insulating coating films by applying the liquid for forming the tension-creating insulating coating films and baking the application liquid.

(4) A method for producing a grain-oriented silicon steel sheet excellent in adhesiveness to tension-creating insulating coating films according to the item (3), characterized by baking an application liquid mainly composed of phosphate and colloidal silica and/or an application liquid mainly composed of alumina sol and boric acid.

BEST MODE FOR CARRYING OUT THE INVENTION

Figure 1:
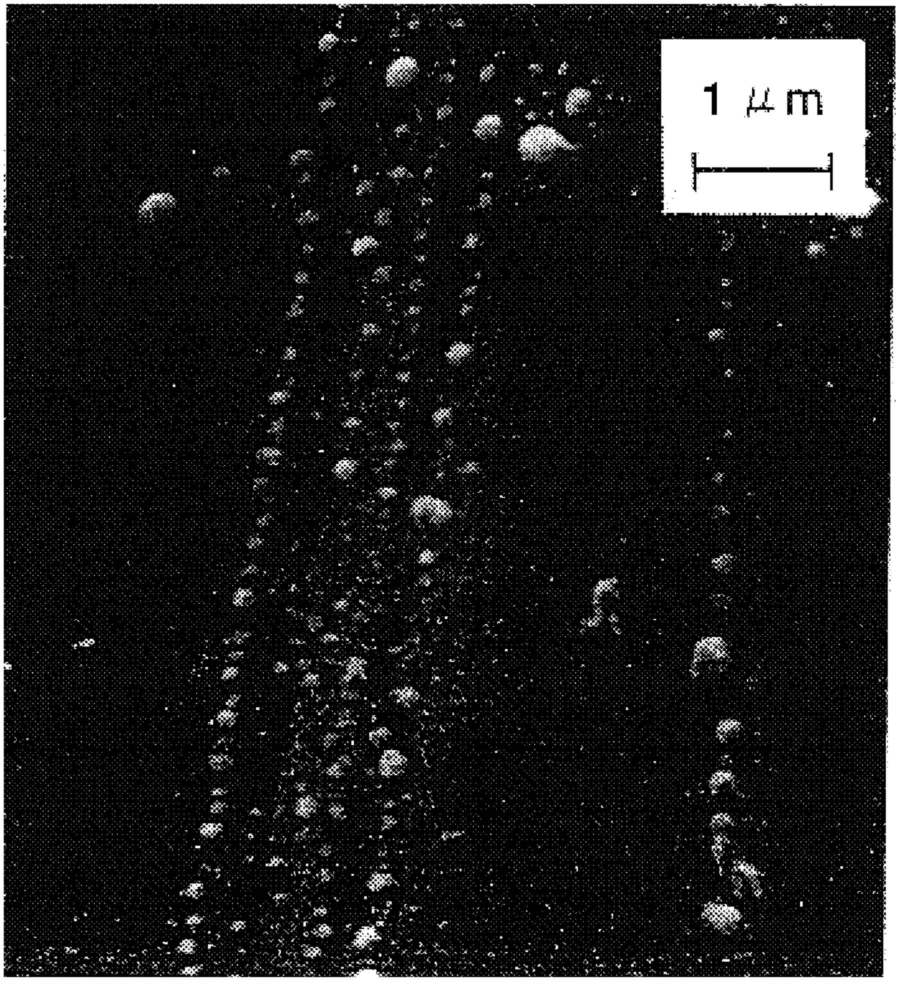
FIG. 1 is a micrograph showing an appearance of external oxidation type particulate oxides mainly composed of silica.

Details of the present invention are explained hereafter.

The present inventors addressed technical improvement for further enhancing the adhesiveness of tension-creating insulating coating films by focusing their attention on, among the technologies proposed as those for securing the adhesiveness, the method by which oxides were formed on the surfaces of a final annealed grain-oriented silicon steel sheet prior to the formation of the tension-creating insulating coating films.

(Micro-Strain, Micro-Roughness and Particulate Silica)

The present inventors suspected that the surface condition of a steel sheet constituted one of the causes of insufficient adhesiveness to a coating film. In other words, they conjectured that the structure of oxides varied depending on the surface condition and the difference in the structure of oxides caused difference in the adhesiveness of a tension-creating insulating coating film. Based on this assumption, they applied a pre-treatment to steel sheets before oxidation and examined the relationship of the application or otherwise of the pretreatment and the structure of oxides to the adhesiveness of tension-creating insulating coating films.

Grain-oriented silicon steel sheets having specular gloss were prepared as specimens by applying an annealing separator mainly composed of alumina to decarburization-annealed steel sheets 0.225 mm in thickness and subjecting the steel sheets to final annealing for secondary recrystallization. Then, two kinds of specimen steel sheets were prepared: one with a pretreatment for imposing micro-strain on the surfaces using a brush coated with silicon carbide abrasive grains, and the other without the pretreatment. Subsequently, oxides were formed on the surfaces of the specimens by subjecting them to a heat treatment in a 25%-nitrogen and 75%-hydrogen atmosphere having a dew point of −1° C. for a soaking time of 10 sec. at different temperatures. Finally, a liquid mainly composed of aluminum phosphate, chromic acid and colloidal silica was applied to the specimens and baked at 835° C. for 30 sec. in a nitrogen atmosphere to form the tension-creating insulating coating films. The adhesiveness of the specimens thus prepared to the coating films was examined.

The adhesiveness to a coating film was evaluated in terms of the area percentage of the portions where the coating film remained adhering to a steel sheet without flaking off when a specimen steel sheet was wound around a cylinder of 20 mm in diameter (the area percentage being hereinafter referred to as a film retention area percentage). In the case where the adhesiveness was so poor that a whole coating film flaked off, the film retention area percentage was 0% and, in the case where the adhesiveness was so good that a film did not flake off at all, the percentage was 100%. A specimen showing a film retention area percentage of 90% or less was marked with X, that showing a film retention area percentage from 91 to 95% was marked with ○, and that showing a film retention area percentage from 96 to 100% was marked with ◎.

For the purpose of examining the structure of oxides existing at the interface between a tension-creating coating film and a steel sheet, a specimen was prepared by the focused ion beam method (hereinafter referred to as the FIB method), and the oxide structure was observed using a transmission electron microscope (hereinafter referred to as a TEM) at a cross-section of the specimen. The FIB method is a method for preparing a thin film test piece of several micrometers in thickness from a desired position of a specimen having coating films so that the films of several micrometers in thickness formed on the steel sheet surfaces can be observed in a cross-sectional direction. A TEM observation of the interface between a steel sheet and a tension-creating coating film in a thin film test piece prepared by the FIB method revealed an external oxidation type oxide film mainly composed of amorphous silica. Among the specimen, in those on the surfaces of which the micro-strain had been imposed using a brush coated with abrasive grains before the oxide films constituting intermediate layers were formed, particulate oxides mainly composed of amorphous silica were observed in addition to the external oxidation type membranous oxide films, and the particulate oxides were found to intrude into the tension-creating coating films, penetrating through the membranous oxide films as shown in FIG. 1. The present inventors observed such interfaces in many specimens and calculated the area percentages of the particulate oxides to the membranous oxide films in the cross-sections (the percentage being hereinafter referred to as a particulate oxide area percentage). The average thickness of a film of external oxidation type oxides was also calculated.

The result is summarized in Table 1.

TABLE 1

Relationship among pretreatment condition, heat treatment condition, cross-sectional observation and coating film adhesiveness

| Specimen number | Pretreatment condition Brushing with brush containing abrasive grains | Heat treatment condition Oxide formation temperature (° C.) | Cross-sectional observation result Average film thickness (nm) | Cross-sectional observation result Particulate oxide area percentage (%) | Coating film adhesiveness Film retention area percentage (%) | Coating film adhesiveness Evaluation |
|---|---|---|---|---|---|---|
| 1 | Not applied | 500 | 1 | 0 | 10 | X |
| 2 | Applied | " | 1 | 1 | 20 | X |
| 3 | Not applied | 600 | 2 | 0 | 90 | X |
| 4 | Applied | " | 3 | 7 | 95 | ○ |
| 5 | Not applied | 700 | 5 | 0 | 90 | X |
| 6 | Applied | " | 7 | 2 | 95 | ○ |
| 7 | Not applied | 800 | 13 | 1 | 90 | X |
| 8 | Applied | " | 14 | 8 | 95 | ○ |
| 9 | Not applied | 900 | 21 | 1 | 90 | X |
| 10 | Applied | " | 24 | 2 | 95 | ○ |
| 11 | Not applied | 1000 | 42 | 1 | 90 | X |
| 12 | Applied | " | 44 | 4 | 100 | ◎ |
| 13 | Not applied | 1100 | 127 | 1 | 90 | X |
| 14 | Applied | " | 132 | 2 | 100 | ◎ |

TABLE 1-continued

Relationship among pretreatment condition, heat treatment condition, cross-sectional observation and coating film adhesiveness

| Specimen number | Pretreatment condition Brushing with brush containing abrasive grains | Heat treatment condition Oxide formation temperature (° C.) | Cross-sectional observation result Average film thickness (nm) | Cross-sectional observation result Particulate oxide area percentage (%) | Coating film adhesiveness Film retention area percentage (%) | Coating film adhesiveness Evaluation |
|---|---|---|---|---|---|---|
| 15 | Not applied | 1150 | 228 | 1 | 90 | X |
| 16 | Applied | " | 232 | 10 | 100 | ⊚ |

Table 1 teaches that the conditions for securing good adhesiveness to a tension-creating insulating coating film are as follows.

Under the conditions of specimen numbers 1 and 2 where the heat treatment temperatures are 500° C. and the thicknesses of the external oxidation type oxide films are 1 nm, the film retention area percentages are as low as 10 and 20%, respectively, and good adhesiveness to the coating films cannot be secured regardless of whether or not the pretreatment using the brush containing abrasive grains is applied. Under the conditions of specimen numbers 3 to 16, on the other hand, where the heat treatment temperatures are from 600 to 1,150° C. and the thicknesses of the external oxidation type oxide films are 2 nm or more, the film retention area percentages are 90% or more and good adhesiveness to the coating films is secured in general. However, it has to be noted that, whereas the adhesiveness to the coating films is good in the cases where the pretreatments using the brush coated with abrasive grains are applied and the cross-sectional area percentages of the particulate oxides are 2% or more, the adhesiveness to the coating films is not altogether perfect even when the thicknesses of the external oxidation type oxide films are large, resulting in the film retention area percentages of 90% in the cases where the pretreatments using the brush coated with abrasive grains are not applied and the amounts of the particulate oxides are as small as 0 to 1% in terms of cross-sectional area percentage. Under the conditions of specimen numbers 12, 14 and 16, in particular, where the thicknesses of the external oxidation type oxide films are 40 nm or more and the heat treatment temperatures are 1,000° C. or higher, the adhesiveness to the coating films is markedly good.

From the results shown in Table 1, good adhesiveness to a tension-creating insulating coating film can be secured when the thickness of an external oxidation type oxide film is 2 nm or more and the sectional area percentage of particulate oxides is 2% or more. It is clear from the above that the particulate oxides can be formed together with the membranous oxides if micro-strain is imposed on the surfaces of a steel sheet prior to the heat treatment for forming the external oxidation type oxide films and, then, the heat treatment for forming the external oxidation type oxide films is applied at a temperature of 600° C. or higher, preferably 1,000° C. or higher.

Subsequently, the present inventors subjected steel sheet specimens to light pickling in a 1% nitric acid bath for 10 sec. at the room temperature as a pretreatment before the formation of external oxidation type oxide films to form micro-roughness at the surfaces of the specimens. Then, under the above conditions, they carried out tests and evaluations through the same procedures as employed in the case of Table 1. Table 2 shows the result.

TABLE 2

Relationship among pretreatment condition, heat treatment condition, cross-sectional observation and coating film adhesiveness

| Specimen number | Pretreatment condition Pickling in nitric acid bath | Heat treatment condition Oxide formation temperature (° C.) | Cross-sectional observation result Average film thickness (nm) | Cross-sectional observation result Particulate oxide area percentage (%) | Coating film adhesiveness Film retention area percentage (%) | Coating film adhesiveness Evaluation |
|---|---|---|---|---|---|---|
| 1 | Not applied | 500 | 1 | 0 | 20 | X |
| 2 | Applied | " | 1 | 1 | 30 | X |
| 3 | Not applied | 600 | 3 | 0 | 90 | X |
| 4 | Applied | " | 3 | 6 | 95 | ○ |
| 5 | Not applied | 700 | 5 | 0 | 90 | X |
| 6 | Applied | " | 6 | 2 | 95 | ○ |
| 7 | Not applied | 800 | 12 | 1 | 90 | X |
| 8 | Applied | " | 13 | 8 | 95 | ○ |
| 9 | Not applied | 900 | 20 | 1 | 90 | X |

TABLE 2-continued

Relationship among pretreatment condition, heat treatment condition, cross-sectional observation and coating film adhesiveness

| Specimen number | Pretreatment condition Pickling in nitric acid bath | Heat treatment condition Oxide formation temperature (° C.) | Cross-sectional observation result Average film thickness (nm) | Cross-sectional observation result Particulate oxide area percentage (%) | Coating film adhesiveness Film retention area percentage (%) | Coating film adhesiveness Evaluation |
|---|---|---|---|---|---|---|
| 10 | Applied | " | 22 | 9 | 95 | ○ |
| 11 | Not applied | 1000 | 43 | 1 | 90 | X |
| 12 | Applied | " | 45 | 25 | 100 | ⊚ |
| 13 | Not applied | 1100 | 125 | 1 | 90 | X |
| 14 | Applied | " | 129 | 2 | 100 | ⊚ |
| 15 | Not applied | 1150 | 218 | 1 | 90 | X |
| 16 | Applied | " | 228 | 10 | 100 | ⊚ |

Table 2 teaches that the conditions for securing good adhesiveness to a tension-creating coating film are as follows.

Under the conditions of specimen numbers 1 and 2 where the heat treatment temperatures are 500° C. and the thicknesses of the external oxidation type oxide films are 1 nm, the film retention area percentages are as low as 20 and 30%, respectively, and good adhesiveness to the coating films cannot be secured regardless of whether or not the pickling treatment with nitric acid for creating micro-roughness is applied. Under the conditions of specimen numbers 3 to 16, on the other hand, where the heat treatment temperatures are from 600 to 1,150° C. and the thicknesses of the external oxidation type oxide films are 2 nm or more, good adhesiveness to the coating films is secured in general. It has to be noted however that, whereas the adhesiveness to the coating films is good in the cases where the light pickling treatments in a nitric acid bath are applied and the cross-sectional area percentages of the particulate oxides are 2% or more, the adhesiveness to the coating films is not altogether perfect even when the thicknesses of the external oxidation type oxide films are large, resulting in the film retention area percentages of 90% in the cases where the pickling treatments are not applied and the amounts of the particulate oxides are as small as 0 to 1% in terms of cross-sectional area percentage. Under the conditions of specimen numbers 12, 14 and 16, in particular, where the thicknesses of the external oxidation type oxide films are 40 nm or more and the heat treatment temperatures are 1,000° C. or higher, the adhesiveness to the coating films is markedly good.

From the results shown in Table 2, good adhesiveness to a tension-creating insulating coating film can be secured when the thickness of an external oxidation type oxide film is 2 nm or more and the sectional area percentage of particulate oxides is 2% or more. It is clear from the above that the particulate oxides can be formed together with the membrane oxides if micro-roughness is imposed on the surfaces of a steel sheet prior to the heat treatment for forming the external oxidation type oxide films and, then, the heat treatment for forming the external oxidation type oxide films is applied at a temperature of 600° C. or higher, preferably 1,000° C. or higher. The mechanisms by which the thickness of an external oxidation type oxide film and the sectional area percentage of particulate oxides have a significant influence on the adhesiveness to a coating film as described above will be explained later.

(Heating Rate and Metal Oxides)

In the next place, the present inventors examined the process conditions for forming the amorphous silica.

During the course of the examination, they assumed that the amorphous silica lay in the condition of the formation of external oxidation type silica, especially in a heating rate at the heating stage of a heat treatment, that the structure of an external oxidation type oxide film changed depending on the heating rate, and that the adhesiveness to a tension-creating insulating coating film was affected by the structure of the oxide film. Based on the above assumption, they carried out the following tests to investigate the relationship of a heating rate and the structure of an external oxidation type oxide film to the adhesiveness to a coating film.

Grain-oriented silicon steel sheets having specular gloss were prepared as specimens by applying an annealing separator mainly composed of alumina to decarburization-annealed steel sheets 0.225 mm in thickness and subjecting the steel sheets to final annealing for secondary recrystallization. External oxidation type oxide films mainly composed of silica were formed on the surfaces of the specimen by subjecting them to a heat treatment in a 25%-nitrogen and 75%-hydrogen atmosphere with a dew point of −2° C. for a soaking time of 15 sec. under the conditions of different temperatures and heating rates. Subsequently, a liquid mainly composed of aluminum phosphate, chromic acid and colloidal silica was applied to the specimens and baked at 835° C. for 30 sec. in a nitrogen atmosphere to form tension-creating insulating coating films. The adhesiveness of the specimen steel sheets thus prepared to the coating films was examined.

The adhesiveness to the coating films was evaluated by the same test method and judgement criterion as explained earlier. In addition, the interface structure between a tension-creating insulating coating film and a steel sheet was observed using a TEM at a cross-section of a specimen prepared by the FIB method.

The cross-sectional observation revealed the local existence of oxides composed of one or more elements of Fe, Al, Ti, Mn and Cr (such as Si—Mn—Cr oxides, Si—Mn—Cr—Al—Ti oxides and Fe oxides, hereinafter referred to as metal oxides) in an external oxidation type oxide film mainly composed of silica. The cross-sectional area percentage of metal oxides in an external oxidation type oxide film mainly composed of silica was calculated based on TEM micrographs.

Figure 2:
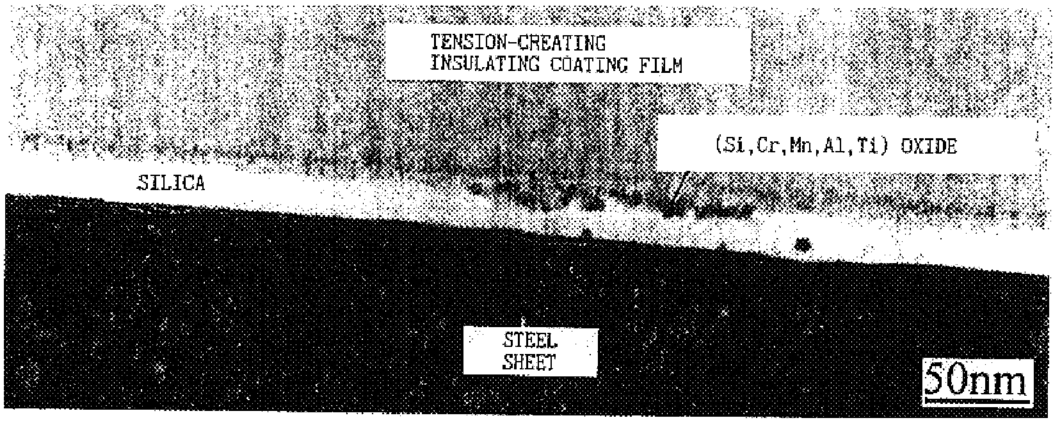
FIG. 2 is the micrograph of a cross-sectional TEM image of specimen number 23 in Table 3.
Figure 3:
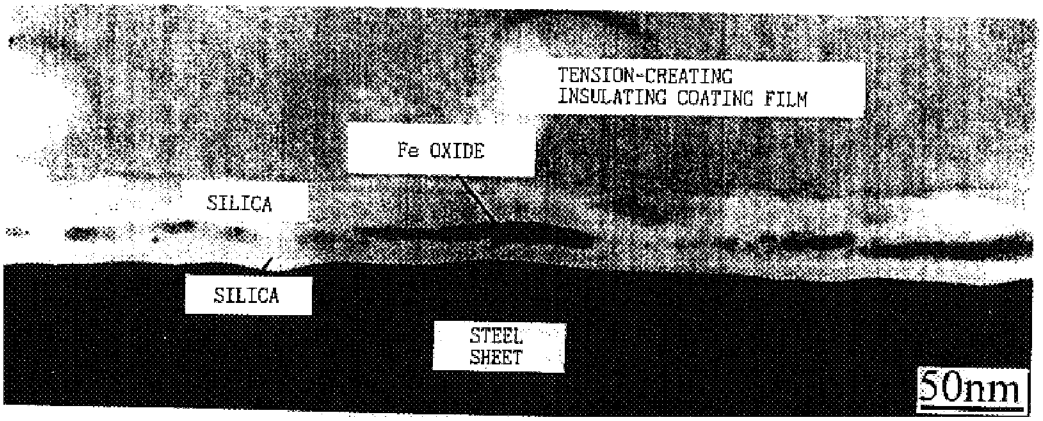
FIG. 3 is the micrograph of a cross-sectional TEM image of specimen number 30 in Table 3.

The results of the above investigations are summarized in Table 3. FIGS. 2 and 3 show cross-sectional observation images of specimen numbers 23 and 30 as examples of the cross-sectional observation.

TABLE 3

| Relationship between heat treatment condition and coating film adhesiveness | | | | | | | |
|---|---|---|---|---|---|---|---|
| | Heat treatment condition | | Coating film adhesiveness | | Cross-sectional observation result | | |
| Specimen number | Heat treatment temperature (° C.) | Heating rate (° C./sec.) | Film retention area percentage (%) | Evaluation | Film thickness (nm) | Area percentage of metallic oxides (%) | Overall evaluation |
| 1 | 500 | 5 | 20 | X | 1 | 20 | X |
| 2 | " | 10 | 10 | X | 1 | 20 | X |
| 3 | " | 20 | 20 | X | 1 | 20 | X |
| 4 | " | 100 | 10 | X | 1 | 30 | X |
| 5 | " | 500 | 10 | X | 1 | 20 | X |
| 6 | 600 | 5 | 50 | X | 2 | 55 | X |
| 7 | " | 10 | 95 | ○ | 2 | 45 | ○ |
| 8 | " | 20 | 95 | ○ | 3 | 50 | ○ |
| 9 | " | 100 | 95 | ○ | 2 | 35 | ○ |
| 10 | " | 500 | 95 | ○ | 2 | 35 | ○ |
| 11 | 700 | 5 | 60 | X | 5 | 60 | X |
| 12 | " | 10 | 95 | ○ | 6 | 45 | ○ |
| 13 | " | 20 | 95 | ○ | 6 | 30 | ◎ |
| 14 | " | 100 | 95 | ○ | 8 | 35 | ○ |
| 15 | " | 500 | 97 | ○ | 7 | 25 | ◎ |
| 16 | 800 | 5 | 70 | X | 15 | 55 | X |
| 17 | " | 10 | 97 | ○ | 13 | 45 | ○ |
| 18 | " | 20 | 95 | ○ | 12 | 30 | ◎ |
| 19 | " | 100 | 95 | ○ | 11 | 40 | ○ |
| 20 | " | 500 | 97 | ○ | 14 | 30 | ◎ |
| 21 | 900 | 5 | 80 | X | 22 | 60 | X |
| 22 | " | 10 | 95 | ○ | 23 | 50 | ○ |
| 23 | " | 20 | 96 | ○ | 26 | 30 | ◎ |
| 24 | " | 100 | 95 | ○ | 21 | 40 | ○ |
| 25 | " | 500 | 97 | ○ | 22 | 15 | ◎ |
| 26 | 1000 | 5 | 90 | X | 47 | 55 | X |
| 27 | " | 10 | 100 | ○ | 43 | 30 | ◎ |
| 28 | " | 20 | 100 | ○ | 44 | 25 | ◎ |
| 29 | " | 100 | 100 | ○ | 40 | 30 | ◎ |
| 30 | " | 500 | 100 | ○ | 42 | 20 | ◎ |
| 31 | 1100 | 5 | 90 | X | 131 | 55 | X |
| 32 | " | 10 | 100 | ○ | 128 | 10 | ◎ |
| 33 | " | 20 | 100 | ○ | 135 | 30 | ◎ |
| 34 | " | 100 | 100 | ○ | 118 | 25 | ◎ |
| 35 | " | 500 | 100 | ○ | 130 | 20 | ◎ |
| 36 | 1150 | 5 | 90 | X | 228 | 55 | X |
| 37 | " | 10 | 100 | ○ | 232 | 30 | ◎ |
| 38 | " | 20 | 100 | ○ | 231 | 15 | ◎ |
| 39 | " | 100 | 100 | ○ | 217 | 20 | ◎ |
| 40 | " | 500 | 100 | ○ | 229 | 25 | ◎ |

Table 3 teaches that the conditions for securing good adhesiveness to a tension-creating coating film are as follows.

Under the conditions of specimen numbers 1 to 4 where the thicknesses of the external oxidation type oxide films are less than 2 nm and the heat treatment temperatures are 500° C., good adhesiveness to the coating films cannot be secured regardless of the sectional area percentages of the metal oxides. Under the conditions of specimen numbers 5 to 40, on the other hand, where the thicknesses of the external oxidation type oxide films are 2 nm or more and the heat treatment temperatures are from 600 to 1,150° C., good adhesiveness to the coating films is secured in general. Under the conditions of specimen numbers 26 to 40, in particular, where the thicknesses of the external oxidation type oxide films are 40 nm or more and the heat treatment temperatures are 1,000° C. or higher, the adhesiveness to the coating films is markedly good. It has to be noted however that, whereas the adhesiveness to the coating films is good in the cases where the heating rates during the heating stage are 10 to 500° C./sec. and the sectional area percentages of the metal oxides in the external oxidation type oxide films are 50% or less, the adhesiveness to the coating films is not always good even when the thicknesses of the external oxidation type oxide films are large, resulting in the film retention area percentages of 90% or less in the cases where the heating rates are 5° C./sec. and the cross-sectional area percentages of the metal oxides are larger than 50%.

Further, when the heat treatment temperatures are 1,000° C. or higher and the heating rates are from 20 to 500° C./sec., the cross-sectional area percentages of the metal oxides in the external oxidation type oxide films are 30% or less and the film retention area percentages are 96% or more and yet better adhesiveness to the coating films is secured.

From Table 3, it can be that it is imperative, for securing good adhesiveness to a tension-creating insulating coating film, that the thickness of an external oxidation type oxide film is 2 nm or more and the cross-sectional area percentage of metal oxides in the external oxidation type oxide film is 50% or less. It is also clear from the table that, in order to form an external oxidation type oxide film having these characteristics, the temperature of a heat treatment for forming the external oxidation type oxide film must be 600° C. or higher, preferably 1,000° C. or higher, and the heating rate during the heating stage must be from 10 to 500° C./sec.

When yet better adhesiveness to a coating film is required, it is desirable that the cross-sectional area percentage of metal oxides in an external oxidation type oxide film be 30% or less. In order to form such an external oxidation type oxide film, it is desirable that the temperature of a heat treatment for forming the external oxidation type oxide film is 600° C. or higher, preferably 1,000° C. or higher, and the heating rate during the heating stage is from 20 to 500° C./sec.

The mechanisms by which the thickness of an external oxidation type oxide film and the cross-sectional area percentage of metal oxides therein have significant influence on the adhesiveness to a coating film as described above will be explained later.

(Cooling Rate and Voids)

The present inventors continued studying the process conditions for forming amorphous silica.

During the course of the study, they conjectured that the structure of an external oxidation type oxide film was changed depending on the cooling rate during the formation of the film, and that the adhesiveness to a tension-creating insulating coating film was affected by the structural difference of the oxide film. To verify the above, the present inventors examined the relationship of the cooling rate and the structure of an external oxidation type oxide film to the adhesiveness to a coating film through the following tests.

Grain-oriented silicon steel sheets having specular gloss were prepared as specimens by applying an annealing separator mainly composed of alumina to decarburization-annealed steel sheets 0.225 mm in thickness and subjecting the steel sheets to final annealing for secondary recrystallization. External oxidation type oxide films were formed on the surfaces of the specimens by subjecting them to a heat treatment in a 25%-nitrogen and 75%-hydrogen atmosphere with a dew point of −5° C. for a soaking time of 10 sec. under the conditions of different temperatures and cooling rates. Subsequently, a liquid mainly composed of phosphate, chromic acid and colloidal silica was applied to the specimen steel sheets and baked at 835° C. for 30 sec. in a nitrogen atmosphere to form tension-creating insulating coating films. The adhesiveness of the specimen steel sheets thus prepared to the coating films was examined.

The adhesiveness to the coating films was evaluated by the same test method and judgement criterion as explained earlier. In addition, the interface structure between a tension-creating insulating coating film and a steel sheet was observed using a TEM at a cross-section of a specimen prepared by the FIB method.

Figure 4:
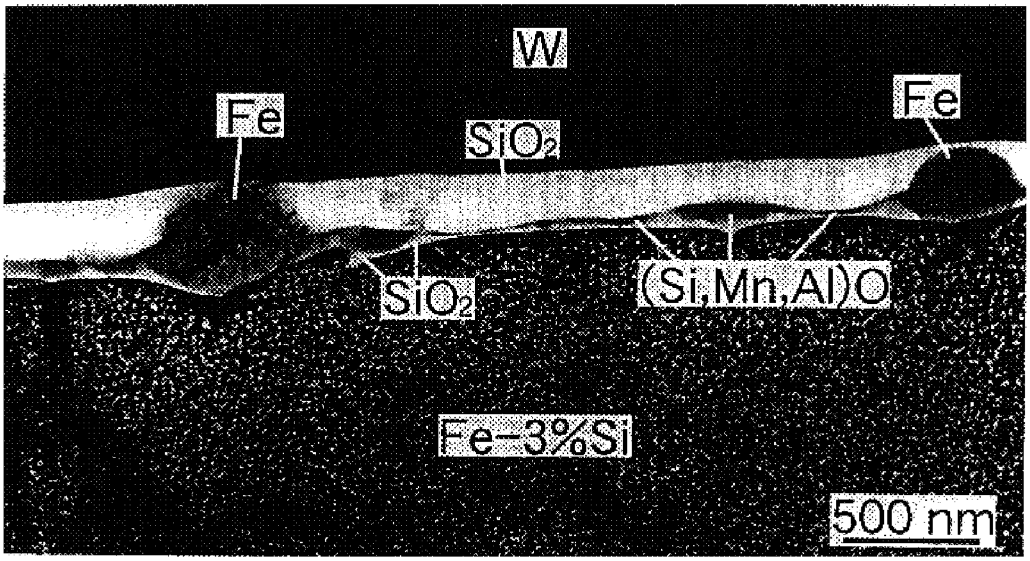
FIG. 4 is the micrograph of a cross-sectional TEM image of specimen number 40 in Table 4.

The cross-sectional observation revealed the local existence of voids in the external oxidation type oxide films. The cross-sectional area percentage of voids was calculated based on TEM micrographs. The results of the above investigations are summarized in Table 4. FIG. 4 shows a cross-sectional TEM observation image of specimen number 40 as an example of the cross-sectional observation. Note that, the cross-section of the specimen number 40 before applying the tension-creating insulating coating films was observed because the adhesiveness of specimen number 40 to the tension-creating insulating coating films was poor and the TEM observation of the cross-section after applying the tension-creating coating films was difficult. The cross-sectional area percentage of the voids found in the external oxidation type oxide films of said specimen was 40%.

TABLE 4

Relationship between heat treatment condition and coating film adhesiveness

| | Heat treatment condition | | Coating film adhesiveness | | Cross-sectional observation result | | |
|---|---|---|---|---|---|---|---|
| Specimen number | Heat treatment temperature (° C.) | Cooling rate (° C./sec.) | Film retention area percentage (%) | Evaluation | Film thickness (nm) | Area percentage of voids (%) | Overall evaluation |
| 1 | 500 | 5 | 10 | X | 1 | 20 | X |
| 2 | " | 10 | 20 | X | 1 | 20 | X |
| 3 | " | 50 | 10 | X | 1 | 30 | X |
| 4 | " | 100 | 20 | X | 1 | 10 | X |
| 5 | " | 200 | 10 | X | 1 | 20 | X |
| 6 | 600 | 5 | 95 | ○ | 2 | 15 | ○ |
| 7 | " | 10 | 95 | ○ | 3 | 20 | ○ |
| 8 | " | 50 | 95 | ○ | 2 | 25 | ○ |
| 9 | " | 100 | 95 | ○ | 3 | 30 | ○ |
| 10 | " | 200 | 50 | X | 2 | 35 | X |
| 11 | 700 | 5 | 95 | ○ | 6 | 20 | ○ |
| 12 | " | 10 | 95 | ○ | 7 | 10 | ○ |
| 13 | " | 50 | 95 | ○ | 5 | 25 | ○ |
| 14 | " | 100 | 95 | ○ | 7 | 30 | ○ |
| 15 | " | 200 | 60 | X | 6 | 40 | X |
| 16 | 800 | 5 | 95 | ○ | 12 | 10 | ○ |
| 17 | " | 10 | 95 | ○ | 14 | 15 | ○ |
| 18 | " | 50 | 95 | ○ | 10 | 25 | ○ |

TABLE 4-continued

Relationship between heat treatment condition and coating film adhesiveness

| Specimen number | Heat treatment condition: Heat treatment temperature (° C.) | Heat treatment condition: Cooling rate (° C./sec.) | Coating film adhesiveness: Film retention area percentage (%) | Coating film adhesiveness: Evaluation | Cross-sectional observation result: Film thickness (nm) | Cross-sectional observation result: Area percentage of voids (%) | Overall evaluation |
|---|---|---|---|---|---|---|---|
| 19 | " | 100 | 95 | ○ | 11 | 20 | ○ |
| 20 | " | 200 | 70 | X | 13 | 35 | X |
| 21 | 900 | 5 | 95 | ○ | 23 | 25 | ○ |
| 22 | " | 10 | 95 | ○ | 24 | 20 | ○ |
| 23 | " | 50 | 95 | ○ | 25 | 10 | ○ |
| 24 | " | 100 | 95 | ○ | 20 | 30 | ○ |
| 25 | " | 200 | 80 | X | 21 | 40 | X |
| 26 | 1000 | 5 | 100 | ◎ | 50 | 20 | ◎ |
| 27 | " | 10 | 100 | ◎ | 42 | 15 | ◎ |
| 28 | " | 50 | 100 | ◎ | 48 | 30 | ◎ |
| 29 | " | 100 | 100 | ◎ | 40 | 25 | ◎ |
| 30 | " | 200 | 90 | X | 41 | 40 | X |
| 31 | 1100 | 5 | 100 | ◎ | 135 | 15 | ◎ |
| 32 | " | 10 | 100 | ◎ | 111 | 10 | ◎ |
| 33 | " | 50 | 100 | ◎ | 123 | 30 | ◎ |
| 34 | " | 100 | 100 | ◎ | 125 | 25 | ◎ |
| 35 | " | 200 | 90 | X | 118 | 35 | X |
| 36 | 1150 | 5 | 100 | ◎ | 232 | 25 | ◎ |
| 37 | " | 10 | 100 | ◎ | 215 | 20 | ◎ |
| 38 | " | 50 | 100 | ◎ | 227 | 15 | ◎ |
| 39 | " | 100 | 100 | ◎ | 208 | 20 | ◎ |
| 40 | " | 200 | 90 | X | 211 | 40 | X |

Table 4 teaches that the conditions for securing good adhesiveness to a tension-creating coating film are as follows.

Under the conditions of specimen numbers 1 to 4 where the thicknesses of the external oxidation type oxide films are less than 2 nm and the heat treatment temperatures are 500° C., good adhesiveness to the coating films cannot be secured regardless of the area percentages of the voids. Under the conditions of specimen numbers 5 to 40, on the other hand, where the thicknesses of the external oxidation type oxide films are 2 nm or more and the heat treatment temperatures are from 600 to 1,150° C., good adhesiveness to the coating films is secured in general. Under the conditions of specimen numbers 26 to 40 and, in particular, where the thicknesses of the external oxidation type oxide films are 40 nm or more and the heat treatment temperatures are 1,000° C. or higher, the adhesiveness to the coating films is markedly good. However, it has to be noted that, whereas the adhesiveness to the coating films is good in the cases where the cooling rates are from 5 to 100° C./sec. and the area percentages of the voids in the external oxidation type oxide films are 30% or less, the adhesiveness to the coating films is not always good even when the thicknesses of the external oxidation type oxide films are large, resulting in the film retention area percentages of 90% in the cases where the cooling rates are 200° C./sec. and the area percentages of the voids are larger than 30%.

From Table 4, it can be seen that it is imperative for securing good adhesiveness to a tension-creating insulating coating film that the thickness of an external oxidation type oxide film be 2 nm or more and the area percentage of voids in the external oxidation type oxide film be 30% or less. It is also clear from the table that, in order to form an external oxidation type oxide film having these characteristics, the temperature of a heat treatment for forming the external oxidation type oxide film must be 600° C. or higher, preferably 1,000° C. or higher, and the cooling rate of the heat treatment must be from 5 to 100° C./sec.

The mechanisms by which the thickness of an external oxidation type oxide film and the area percentage of voids therein have significant influence on the adhesiveness to a coating film as described above will be explained later.

(Dew Point of Cooling Atmosphere and Metallic Iron)

The present inventors further studied the process conditions for forming amorphous silica.

During the course of the study, they conjectured that the structure of an external oxidation type oxide film was changed depending on the conditions for forming the external oxidation type oxide film, in particular the cooling atmosphere, and that the adhesiveness to a tension-creating insulating coating film was affected by the structural difference of the oxide film. To confirm the above, the present inventors examined the relationship of a cooling atmosphere and the structure of an external oxidation type oxide film to the adhesiveness to a coating film through the following tests.

Grain-oriented silicon steel sheets having specular gloss were prepared as specimens by applying an annealing separator, mainly composed of alumina, to decarburization-annealed steel sheets 0.225 mm in thickness and subjecting the steel sheets to final annealing for secondary recrystallization. External oxidation type oxide films mainly composed of silica were formed on the surfaces of the specimen steel sheets by subjecting them to a heat treatment in a 25%-nitrogen and 75%-hydrogen atmosphere with a dew point of 0° C. for a soaking time of 10 sec. under the conditions of different temperatures and cooling atmospheres. Here, the specimen steel sheets were cooled in 100%-nitrogen atmospheres with different dew points. Subsequently, a liquid mainly composed of phosphate, chromic acid and colloidal silica was applied to the specimens and baked at 835° C. for 30 sec. in a nitrogen atmosphere to form tension-creating insulating coating films. The adhesiveness of the specimen steel sheets thus prepared to the coating films was examined.

The adhesiveness to a coating film was evaluated by the same test method and judgement criterion as explained earlier. In addition, the interface structure between a tension-creating insulating coating film and a steel sheet was observed using a TEM at a cross-section of a specimen prepared by the FIB method.

The cross-sectional observation revealed the local existence of iron in a metallic state in an external oxidation type oxide film mainly composed of silica. The cross-sectional area percentage of metallic iron in an external oxidation type oxide film mainly composed of silica was calculated based on TEM micrographs.

The results of the above investigations are summarized in Table 5.

TABLE 5

Relationship between heat treatment condition and coating film adhesiveness

| | Heat treatment condition | | Coating film adhesiveness | | Cross-sectional observation result | | |
|---|---|---|---|---|---|---|---|
| Specimen number | Heat treatment temperature (° C.) | Dew point of cooling atmosphere (° C./sec.) | Film retention area percentage (%) | Evaluation | Film thickness (nm) | Area percentage of metallic iron (%) | Overall evaluation |
| 1 | 500 | 0 | 20 | X | 1 | 20 | X |
| 2 | " | 20 | 10 | X | 1 | 30 | X |
| 3 | " | 40 | 20 | X | 1 | 20 | X |
| 4 | " | 60 | 10 | X | 1 | 30 | X |
| 5 | " | 65 | 10 | X | 1 | 20 | X |
| 6 | 600 | 10 | 95 | ○ | 3 | 25 | ○ |
| 7 | " | 30 | 95 | ○ | 2 | 20 | ○ |
| 8 | " | 40 | 95 | ○ | 2 | 30 | ○ |
| 9 | " | 55 | 95 | ○ | 3 | 20 | ○ |
| 10 | " | 70 | 50 | X | 2 | 35 | X |
| 11 | 700 | 5 | 95 | ○ | 7 | 15 | ○ |
| 12 | " | 15 | 95 | ○ | 6 | 20 | ○ |
| 13 | " | 30 | 95 | ○ | 5 | 25 | ○ |
| 14 | " | 50 | 95 | ○ | 6 | 30 | ○ |
| 15 | " | 70 | 60 | X | 6 | 50 | X |
| 16 | 800 | 20 | 95 | ○ | 14 | 20 | ○ |
| 17 | " | 40 | 95 | ○ | 13 | 10 | ○ |
| 18 | " | 50 | 95 | ○ | 10 | 25 | ○ |
| 19 | " | 55 | 95 | ○ | 12 | 30 | ○ |
| 20 | " | 65 | 70 | X | 13 | 35 | X |
| 21 | 900 | 30 | 95 | ○ | 25 | 25 | ○ |
| 22 | " | 40 | 95 | ○ | 24 | 30 | ○ |
| 23 | " | 50 | 95 | ○ | 23 | 10 | ○ |
| 24 | " | 60 | 95 | ○ | 20 | 20 | ○ |
| 25 | " | 70 | 80 | X | 22 | 40 | X |
| 26 | 1000 | 0 | 100 | ◎ | 47 | 20 | ◎ |
| 27 | " | 15 | 100 | ◎ | 43 | 25 | ◎ |
| 28 | " | 35 | 100 | ◎ | 45 | 15 | ◎ |
| 29 | " | 55 | 100 | ◎ | 40 | 25 | ◎ |
| 30 | " | 70 | 90 | X | 44 | 45 | X |
| 31 | 1100 | −5 | 100 | ◎ | 133 | 15 | ◎ |
| 32 | " | 15 | 100 | ◎ | 125 | 10 | ◎ |
| 33 | " | 35 | 100 | ◎ | 133 | 30 | ◎ |
| 34 | " | 60 | 100 | ◎ | 119 | 25 | ◎ |
| 35 | " | 65 | 90 | X | 122 | 35 | X |
| 36 | 1150 | 0 | 100 | ◎ | 242 | 25 | ◎ |
| 37 | " | 25 | 100 | ◎ | 222 | 30 | ◎ |
| 38 | " | 50 | 100 | ◎ | 236 | 15 | ◎ |
| 39 | " | 60 | 100 | ◎ | 218 | 20 | ◎ |
| 40 | " | 65 | 90 | X | 223 | 35 | X |

Table 5 teaches that the conditions for securing good adhesiveness to a tension-creating coating film are as follows.

Under the conditions of specimen numbers 1 to 4 where the thicknesses of the external oxidation type oxide films are less than 2 nm and the heat treatment temperatures are 500° C., good adhesiveness to the coating films cannot be secured regardless of the cross-sectional area percentages of the metallic iron. Under the conditions of specimen numbers 5 to 40, on the other hand, where the thicknesses of the external oxidation type oxide films are 2 nm or more and the heat treatment temperatures are from 600 to 1,150° C., good adhesiveness to the coating films is secured in general. Under the conditions of specimen numbers 26 to 40, in particular, where the thicknesses of the external oxidation type oxide films are 40 nm or more and the heat treatment temperatures are 1,000° C. or higher, the adhesiveness to the coating films is markedly good. However, it has to be noted that, whereas the adhesiveness to the coating films is good in the cases where the dew points of the cooling atmosphere are 60° C. or lower and the cross-sectional area percentages of the metallic iron in the external oxidation type oxide films are 30% or less, the adhesiveness to the coating films is not always good even when the thicknesses of the external oxidation type oxide films are large, resulting in the film retention area percentages of 90% in the cases where the dew points of the cooling atmosphere are 65° C. or higher and the sectional area percentages of the metallic iron exceed 30%.

From Table 5, it can be that it is imperative for securing good adhesiveness to a tension-creating insulating coating film that the thickness of an external oxidation type oxide film be 2 nm or more and the amount of metallic iron in the external oxidation type oxide film be 30% or less in terms of cross-sectional area percentage. It is also clear from the table that, in order to form an external oxidation type oxide film having these characteristics, the temperature of a heat treatment for forming the external oxidation type oxide film must be 600° C. or higher, preferably 1,000° C. or higher, and the dew point of the cooling atmosphere of the heat treatment must be 60° C. or lower.

For the purpose of lowering the oxidizing capacity of a cooling atmosphere, hydrogen may be added to the atmosphere.

The mechanisms by which the thickness of an external oxidation type oxide film and the cross-sectional area percentage of the metallic iron therein have significant influence on the adhesiveness to a coating film, as described above, will be explained later.

(Contact Time with Application Liquid and Low-Density Layers)

The present inventors studied the process for forming a tension-creating insulating coating film subsequent to the process for forming amorphous silica.

The present inventors conjectured that, in the processes where an application liquid for forming a tension-creating insulating coating film was applied to a steel sheet and baked, in particular, the time during which the application liquid and the steel sheet contacted each other in a low temperature range had an influence on the adhesiveness to a coating film. In other words, they estimated that the structure of the interface between an external oxidation type oxide film and a tension-creating insulating coating film, especially the structure on the side of the external oxidation type oxide film, was changed depending on the time during which the application liquid contacted the steel sheet and that the adhesiveness of the tension-creating insulating coating film varied owing to the difference in the structure. Based on the estimation, the present inventors examined the relationship of the time during which an application liquid contacted a steel sheet covered with external oxidation type oxide films and the structure of the external oxidation type oxide films to the adhesiveness to a coating film through the following tests.

Grain-oriented silicon steel sheets having specular gloss were prepared as specimens by applying an annealing separator, mainly composed of alumina, to decarburization-annealed steel sheets 0.225 mm in thickness and subjecting the steel sheets to final annealing for secondary recrystallization. External oxidation type oxide films mainly composed of silica were formed on the surfaces of the specimens by subjecting them to a heat treatment in a 20%-nitrogen and 80%-hydrogen atmosphere with a dew point of +2° C. for a soaking time of 8 sec. under the conditions of different temperatures and heat treatments. Subsequently, a liquid mainly composed of aluminum phosphate, chromic acid and colloidal silica was applied to the specimens and baked at 835° C. for 30 sec. in a nitrogen atmosphere to form tension-creating insulating coating films. Here, the tension-creating insulating coating films were formed while changing the times during which the application liquid contacted the steel sheet in the temperature range of 100° C. or lower. The adhesiveness of the specimen steel sheets thus prepared to the coating films was examined.

The adhesiveness to a coating film was evaluated by the same test method and judgement criterion as explained earlier. In addition, the interface structure between a tension-creating insulating coating film and a steel sheet was observed using a TEM at a cross-section of a specimen prepared by the FIB method.

Besides the above, the density distribution in the thickness direction of an external oxidation type oxide film mainly composed of silica was measured by the electron energy loss spectroscopy (hereinafter referred to as the EELS method).

The EELS method is a method wherein an electron beam is irradiated in the thickness direction of a thin film specimen prepared by the FIB method or the like and the strength of scattered electron beams is measured against to lost energy, and the density of the film is calculated from the ratio between elastic scattering strength and inelastic scattering strength taking advantage of the fact that said ratio is proportional to the density of a substances composing the film.

Thin film specimens were prepared by the FIB method and the densities of external oxidation type oxide films mainly composed of silica were measured by the TEM-EELS method and, as a result, a density distribution was revealed. In particular, it was observed that the density of an external oxidation type oxide film was lower on the side near the interface between the external oxidation type oxide film mainly composed of silica and a tension-creating insulating coating film, compared with the densities thereof in the center of the oxide film thickness and on the side near the interface between the oxide film and a steel sheet. When the density of an external oxidation type oxide film at a portion near the interface with a steel sheet was defined as Di, a portion of the external oxidation type oxide film where a measured density Ds was not more than 0.8 times the density Di was defined as a low-density portion, and the ratio of the average thickness of the low-density portions to the total thickness of the external oxidation type oxide film was defined as a low-density layer ratio.

The results of the above examinations are summarized in Table 6.

TABLE 6

| | | Relationship between heat treatment condition and coating film adhesiveness | | | | | |
|---|---|---|---|---|---|---|---|
| | | | Coating film adhesiveness | | Cross-sectional observation result | | |
| Specimen number | Oxide formation temperature (° C.) | Contact time with application liquid (sec.) | Film retention area percentage (%) | Evaluation | Film thickness (nm) | Low-density layer ratio (%) | Overall evaluation |
| 1 | 500 | 0.1 | 20 | X | 1 | 20 | X |
| 2 | " | 1 | 20 | X | 1 | 30 | X |
| 3 | " | 5 | 20 | X | 1 | 30 | X |
| 4 | " | 20 | 10 | X | 1 | 20 | X |
| 5 | " | 30 | 10 | X | 1 | 20 | X |
| 6 | 600 | 0.1 | 95 | ○ | 2 | 25 | ○ |
| 7 | " | 1 | 95 | ○ | 3 | 25 | ○ |
| 8 | " | 5 | 95 | ○ | 2 | 30 | ○ |
| 9 | " | 20 | 95 | ○ | 3 | 30 | ○ |
| 10 | " | 30 | 50 | X | 2 | 45 | X |
| 11 | 700 | 0.1 | 95 | ○ | 5 | 20 | ○ |
| 12 | " | 1 | 95 | ○ | 7 | 30 | ○ |
| 13 | " | 5 | 95 | ○ | 6 | 25 | ○ |
| 14 | " | 20 | 95 | ○ | 6 | 30 | ○ |
| 15 | " | 30 | 60 | X | 7 | 40 | X |
| 16 | 800 | 0.1 | 95 | ○ | 14 | 20 | ○ |
| 17 | " | 1 | 95 | ○ | 13 | 25 | ○ |
| 18 | " | 5 | 95 | ○ | 11 | 25 | ○ |
| 19 | " | 20 | 95 | ○ | 12 | 30 | ○ |
| 20 | " | 30 | 70 | X | 14 | 35 | X |
| 21 | 900 | 0.1 | 95 | ○ | 22 | 20 | ○ |
| 22 | " | 1 | 95 | ○ | 24 | 20 | ○ |
| 23 | " | 5 | 95 | ○ | 26 | 25 | ○ |
| 24 | " | 20 | 95 | ○ | 25 | 30 | ○ |
| 25 | " | 30 | 80 | X | 23 | 40 | X |
| 26 | 1000 | 0.1 | 100 | ○ | 45 | 15 | ◎ |
| 27 | " | 1 | 100 | ○ | 43 | 15 | ◎ |
| 28 | " | 5 | 100 | ○ | 42 | 20 | ◎ |
| 29 | " | 20 | 100 | ○ | 41 | 20 | ◎ |
| 30 | " | 30 | 90 | X | 40 | 35 | X |
| 31 | 1100 | 0.1 | 100 | ○ | 129 | 15 | ◎ |
| 32 | " | 1 | 100 | ○ | 130 | 15 | ◎ |
| 33 | " | 5 | 100 | ○ | 135 | 20 | ◎ |
| 34 | " | 20 | 100 | ○ | 121 | 20 | ◎ |
| 35 | " | 30 | 90 | X | 134 | 35 | X |
| 36 | 1150 | 0.1 | 100 | ○ | 231 | 15 | ◎ |
| 37 | " | 1 | 100 | ○ | 229 | 10 | ◎ |
| 38 | " | 5 | 100 | ○ | 230 | 15 | ◎ |
| 39 | " | 20 | 100 | ○ | 227 | 20 | ◎ |
| 40 | " | 30 | 90 | X | 225 | 35 | X |

Table 6 teaches that the conditions for securing good adhesiveness to a tension-creating coating film are as follows.

Under the conditions of specimen numbers 1 to 4 where the thicknesses of the external oxidation type oxide films are less than 2 nm and the heat treatment temperatures are 500° C., good adhesiveness to the coating films cannot be secured regardless of the time during which the steel sheets covered with the external oxidation type oxide films mainly composed of silica contact the application liquids. Under the conditions of specimen numbers 5 to 40, on the other hand, where the thicknesses of the external oxidation type oxide films are 2 nm or more and the heat treatment temperatures are from 600 to 1,150° C., good adhesiveness to the coating films is secured in general. Under the conditions of specimen numbers 26 to 40, in particular, where the thicknesses of the external oxidation type oxide films are 40 nm or more and the heat treatment temperatures are 1,000° C. or higher, the adhesiveness to the coating films is markedly good. It has to be noted however that, whereas the adhesiveness to the coating films is good in the cases where the contact times between the steel sheets covered with the external oxidation type oxide films mainly composed of silica and the application liquids are 20 sec. or less and the ratios of the low-density layers in the external oxidation type oxide films are 30% or less, the adhesiveness to the coating films is not always good even when the thicknesses of the external oxidation type oxide films are large, resulting in the film retention area percentages of 90% in the cases where the contact times are 30 sec. and the low-density layer ratios exceed 30%.

From Table 6, it can be seen that it is imperative, for securing good adhesiveness to a tension-creating insulating coating film, that the thickness of an external oxidation type oxide film be 2 nm or more and the low-density layer ratio in the external oxidation type oxide film be 30% or less. It is also clear from the table that, in order to form an external oxidation type oxide film having these characteristics, the temperature of a heat treatment for forming the external oxidation type oxide film must be 600° C. or higher, preferably 1,000° C. or higher, and a contact time between a steel sheet covered with the external oxidation type oxide film and an application liquid for forming the tension-creating insulating coating film must be 30 sec. or less in the process for forming the tension-creating insulating coating film.

The lower limit of a contact time between a steel sheet covered with an external oxidation type oxide film and an application liquid for forming a tension-creating insulating coating film is not clear as yet, but, if it is shorter than 0.1 sec., the time is too short for a steel sheet to be wetted with an application liquid and the liquid application is likely to be uneven. For this reason, it is better to control a contact time between a steel sheet and an application liquid in the temperature range of 100° C. or lower to 0.1 sec. or longer.

The mechanisms by which the thickness of an external oxidation type oxide film and a low-density layer ratio have a significant influence on the adhesiveness to a coating film as described above will be explained later.

(Securing Adhesiveness to Coating Film by Forming Intermediate Layer)

The imposition of tension on a steel sheet using a tension-creating insulating coating film is brought about by the difference in thermal expansion coefficients between the tension-creating insulating coating film and the steel sheet. At this time, a large stress is imposed on the interface between the tension-creating insulating coating film and the steel sheet. It is the structure of the interface that sustains the stress and governs the adhesiveness between the tension-creating insulating coating film and the steel sheet.

In other words, the adhesiveness between a tension-creating insulating coating film and a steel sheet, namely stress resistance, is determined by the interface structure between them.

The present inventors think it is important to form an intermediate layer having good adhesiveness to both a steel sheet, which is a metal material, and a tension-creating insulating coating film, which is a ceramic material, at their interface which governs adhesiveness. According to this idea, it is very effective, for securing good adhesiveness to a tension-creating insulating coating film, to form oxides mainly composed of amorphous silica on each of the surfaces of a steel sheet through an oxidation process and to make the oxides act as an intermediate layer. The reason for this is explained below.

Firstly, the interface on the side of a steel sheet is explained.

Amorphous silica is formed by oxidizing a steel sheet and, for this reason, the silica thus formed has a structure consistent with the steel sheet. Therefore, amorphous silica is considered to have high adhesiveness to a steel sheet.

Next, the interface on the side of a tension-creating insulating coating film is explained.

A tension-creating insulating coating film is of an oxide type ceramic material. Silica is also an oxide and, for this reason, a strong chemical bond is formed between them by the covalence of oxygen atoms. Consequently, good adhesiveness is obtained on this side as well.

For the above reason, the present inventors think that the technique of forming an intermediate layer composed of amorphous silica is very effective in securing good adhesiveness to a tension-creating insulating coating film.

(Relationship Between Microstructure of Amorphous Silica and Adhesiveness to Tension-Creating Coating Film)

Based on the above thought, the relationship between the microstructure of amorphous silica and the adhesiveness to a coating film can be easily understood.

It was explained earlier that two different kinds of microstructures of silica were formed by external oxidation, namely the membranous silica and the particulate silica. Further, in the layer of the external oxidation type membranous silica, there are portions containing metal oxides composed of one or more of Fe, Al, Ti, Mn and Cr, voids, metallic iron and low density layers. The present inventors think that the particulate silica enhances the adhesiveness to a coating film, while the metal oxides, voids, metallic iron and low density layers deteriorate the adhesiveness to a coating film, by the mechanisms described below.

Firstly, the particulate silica is explained.

The particles of silica are formed in the state of penetrating through the thickness of an external oxidation type oxide film. For this reason, the present inventors suppose that the particles of silica intrude into a tension-creating coating film, namely engage with a coating film like wedges, when a tension-creating insulating coating film is formed, and by so doing, strong stress resistance is created.

The relationship between the adhesiveness of a tension-creating insulating coating film to a steel sheet and the cross-sectional area percentage of particulate oxides is explained below.

The present inventors think as follows: when the ratio of particulate oxides to an external oxidation type oxide film is 2% or more, intermediate layer withstand the stress; on the other hand, when the ratio of the particulate oxides is less than 2%, the intermediate layer cannot withstand the stress imposed by a tension-creating insulating coating film and the coating film flakes off.

The roles of the metal oxides, voids, metallic iron and low density layers found in external oxidation type membranous silica can also be explained by using stress resistance. It was explained earlier that a large thermal stress was imposed on the interface between a tension-creating insulating coating film and a steel sheet. It is quite thinkable that all of the metal oxides, voids, metallic iron and low density layers act as some kinds of defects when a stress is imposed. The present inventors presume, therefore, that, when the ratios of these defective points to the whole silica film are beyond a certain level, the intermediate layer cannot withstand the stress at the interface any longer and the coating film flakes off as a result.

The relationship between the adhesiveness of a tension-creating insulating coating film to a steel sheet and the cross-sectional area percentages of defective points is explained below.

When each amount of voids, metallic iron and low-density layers exceeds 30% in terms of cross-sectional area percentage, the coating film adhesiveness deteriorates. On the other hand, with regard to metal oxides, good adhesiveness is maintained as long as the cross-sectional area percentage thereof is 50% or less. The reason for the difference is not made sufficiently clear yet, but the present inventors suppose as follows: whereas the voids and metallic iron, which have totally different structures from that of silica, are quite alien from silica constituting the matrix, the metal oxides are oxides, which silica also is, even though both have different component elements; and thus the deterioration of adhesiveness does not occur with the latter even when the area percentage thereof is higher than that of the former.

(Mechanisms of Microstructure Formation)

Details of the mechanisms by which particulate oxides are formed in an external oxidation type oxide film have not been made clear as yet. However, the present inventors estimate as follows. When micro-strain is imposed on a steel sheet surface using a brush coated with abrasive grains or micro-roughness is formed by pickling prior to the formation of an external oxidation type oxide film, oxide films develop particularly from the micro-strain or micro-roughness serving as a nucleation point, and grow to finally form particles.

As for the mechanisms by which the metal oxides are formed in an external oxidation type oxide film, the details are not clear as yet, either. However, at present, the present inventors estimate as follows. In the first place, when a heating rate during a heating stage is low, the resident time of a steel sheet subjected to a heat treatment in a low temperature range becomes long and, therefore, not only Si but also other elements such as Fe, Mn, Cr, Al and Ti are oxidized in the low temperature range. Thereafter, when and after the temperature reaches a soaking temperature, an oxide film mainly composed of silica is formed and, at this stage, the metal oxides formed during the heating stage are left in the silica film. In contrast, when a heating rate during a heating stage is high, the resident time in a low temperature range is short and the oxidation of the elements such as Fe, Mn, Cr, Al and Ti does not take place. As a result, when and after the temperature reaches a soaking temperature, though an oxide film mainly composed of silica is formed, the metal oxides are not included in the oxide film.

Details of the reaction mechanisms by which voids are formed in an external oxidation type oxide film are not clear as yet either. However, the present inventors estimate as follows. Firstly, during the formation of an external oxidation type oxide film, lattice defects and the like accumulated near the interface between the oxide film and a steel sheet concentrate in the external oxidation type oxide film and form voids. At this time, when a low cooling rate is applied, the defects are removed outside the oxide film, but, on the other hand, when a cooling rate is high, time enough to remove the defects to the outside of the oxide film is not available and therefore the defects remain accumulated in the external oxidation type oxide film and develop into voids.

Details of the mechanisms by which metallic iron is formed in an external oxidation type oxide film are not clear as yet, either. However, the present inventors think as follows. After the formation of an external oxidation type oxide film mainly composed of silica, under the condition that the oxidizing capacity of a cooling atmosphere is high, or the dew point thereof is high, some reaction takes place and that causes metallic iron to form in the external oxidation type oxide film. On the other hand, when the oxidizing capacity of a cooling atmosphere is low, or the dew point thereof is low, the reaction of taking metallic iron into the external oxidation type oxide film does not take place.

Details of the mechanisms by which low-density layers are formed in an external oxidation type oxide film are not yet clear either. However, the present inventors think as follows.

Firstly, when an application liquid for forming tension-creating insulating coating films is applied to a steel sheet covered with external oxidation type oxide films, a kind of swelling reaction takes place in the external oxidation type oxide films and that leads to the structural relaxation of the external oxidation type oxide films. The structural relaxation is caused by moisture and the like contained in the application liquid and, therefore, it occurs on the sides contacting the application liquid of the external oxidation type oxide films when viewed in a cross-sectional direction. In fact, when the density distribution at a section of a specimen prepared by the FIB method was measured by the TEM-EELS method, low-density portions were observed at the part where an external oxidation type oxide film contacted a tension-creating insulating coating film.

Next, the relationship between the ratio of low-density layers to the whole film thickness and the contact time with the application liquid is explained below.

When the contact time of a steel sheet with an application liquid, while the temperature is 100° C. or lower, is short, the swelling-like reaction of an external oxidation type oxide film caused by moisture and the like contained in the application liquid can hardly take place and, consequently, the ratio of low-density layers is low. On the other hand, when the contact time of a steel sheet with an application liquid, while the temperature is 100° C. or lower, is long, the swelling-like reaction of an external oxidation type oxide film caused by moisture and the like contained in the application liquid takes place easily and, consequently, the ratio of low-density layers becomes high.

(Temperature-Dependency of Film Thickness)

Next, the relationship between the temperature of a heat treatment and the thickness of an external oxidation type oxide film is explained below.

It is generally said that an external oxidation type oxide film grows as a result of the diffusion of metal atoms from inside a steel sheet to a surface thereof and their reaction with oxidizing gas at the surface. Therefore, the rate of growth of the oxide film is determined by the diffusion rate of the atoms. The diffusion of atoms is accelerated by thermal energy. Thus, the higher the temperature is, the more the diffusion of atoms is accelerated and the more the external oxidation type oxide film grows. Because of the mechanisms, it is conjectured as follows: under the condition that a heat treatment temperature is as low as 500° C., the growth of an external oxidation type oxide film is not sufficient and, consequently, the adhesiveness to the coating film is not sufficient either; on the other hand, when a heat treatment temperature is 600° C. or higher, an external oxidation type oxide film grows sufficiently and, consequently, the adhesiveness to the coating film is good; and, further, when a heat treatment temperature is 1,000° C. or higher, the oxide film grows more easily and the adhesiveness to a coating film becomes very good.

The appropriateness of the above conjecture is confirmed through the result of measuring the thickness of an external oxidation type oxide film with a TEM; whereas, under the condition that a heat treatment temperature is 500° C. where the thickness of an external oxidation type oxide film is 1 nm as a result of its insufficient growth, the adhesiveness to a tension-creating insulating coating film is poor, under the condition that a heat treatment temperature is 600° C. or higher where the thickness of an external oxidation type oxide film is 2 nm or more as a result of its sufficient growth, the adhesiveness to the coating film is good.

The upper limit of the thickness of an external oxidation type oxide film has not been identified as yet. However, when a thickness exceeds 500 nm, the volume of non-magnetic portions increases and the stacking factor, which constitutes an important performance indicator of a transformer, deteriorates. For this reason, it is desirable to limit a thickness to 500 nm or less.

(Introduction of Micro-Strain or Micro-Roughness and Formation of Particulate Silica)

EXAMPLE 1

Cold-rolled steel sheets 0.225 mm in thickness having a Si concentration of 3.30% for producing grain-oriented silicon steel sheets were decarburization-annealed and, then, pickled in a mixed solution bath of ammonium fluoride and sulfuric acid for dissolving and removing surface oxide layers. Thereafter, the steel sheets were coated with alumina powder by the electrostatic coating method and then final annealed at 1,200° C. for 20 h. in a dry hydrogen atmosphere. Thus, the grain-oriented silicon steel sheets produced through the above processes and having completed secondary recrystallization were free of inorganic mineral materials and had specular gloss on the surfaces. One of the steel sheets (invented sample) was brushed with a brush coated with alumina abrasive grains, while the other (comparative sample) was not. Subsequently, the steel sheets underwent a heat treatment at 900° C. in a 50%-nitrogen and 50%-hydrogen atmosphere having a dew point of −10° C. to form external oxidation type oxide films. Thereafter, a liquid mixture composed of 50 ml aqueous solution containing magnesium/aluminum phosphate of 50% concentration, 66 ml aqueous solution containing dispersed colloidal silica of 30% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the cross-sections thereof were examined by the FIB-TEM method, and the average thicknesses of the external oxidation type oxide films and the cross-sectional area percentages of particulate oxides were calculated. In addition, the adhesiveness to the coating films was evaluated in terms of the film retention area percentage after winding the steel sheets around a cylinder 20 mm in diameter. Table 7 shows the results.

TABLE 7

| Pretreatment condition Brushing with brush containing abrasive grains | Cross-sectional observation result Average film thickness (nm) | Particulate oxide area percentage (%) | Coating film adhesiveness Film retention area percentage (%) | Evaluation | Remarks |
|---|---|---|---|---|---|
| Not applied | 22 | 1 | 90 | X | Comparative sample |
| Applied | 23 | 10 | 95 | ○ | Invented sample |

From Table 7, the invented sample, which is brushed with the brush coated with abrasive grains and has a particulate oxide area percentage of 16% and a film retention area percentage of 95%, is superior in the adhesiveness to the coating film to the comparative sample, which is not brushed with the brush coated with abrasive grains and has a particulate oxide area percentage of 1% and a film retention area percentage of 90%.

EXAMPLE 2

Cold-rolled steel sheets 0.225 mm in thickness having a Si concentration of 3.35% for producing grain-oriented silicon steel sheets were decarburization-annealed, coated with a water slurry of an annealing separator mainly composed of magnesia and bismuth chloride, dried, and then final annealed at 1,200° C. for 20 h. in a dry hydrogen atmosphere. Thus, the grain-oriented silicon steel sheets having completed secondary recrystallization and having little inorganic mineral materials on the surfaces were obtained. Subsequently, one of the steel sheets (invented sample) was pickled in a 2%-nitric acid bath at the room temperature for 5 sec. to form micro-roughness on the surfaces, while the other (comparative sample) was not. Then, the steel sheets underwent a heat treatment at 1,150° C. in a 25%-nitrogen and 75%-hydrogen atmosphere with a dew point of −15° C. to form external oxidation type oxide films mainly composed of silica. Thereafter, a liquid mixture composed of 50 ml aqueous solution containing magnesium phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the insulating coating films was evaluated in terms of the film retention area percentage after winding the steel sheets around a cylinder 20 mm in diameter. Table 8 shows the results.

TABLE 8

| Pretreatment condition Pickling in nitric acid bath | Sectional observation result Average film thickness (nm) | Particulate oxide area percentage (%) | Coating film adhesiveness Film retention area percentage (%) | Evaluation | Remarks |
|---|---|---|---|---|---|
| Not applied | 212 | 1 | 90 | X | Comparative sample |
| Applied | 230 | 15 | 95 | ○ | Invented sample |

From Table 8, the invented sample, which is subjected to the pretreatment pickling and has a particulate oxide area percentage of 15% and a film retention area percentage of 95%, is superior in the adhesiveness to the coating film to the comparative sample, which is not subjected to the pickling and has a particulate oxide area percentage of 1% and a film retention area percentage of 90%.

EXAMPLE 3

Cold-rolled steel sheets 0.225 mm in thickness having a Si concentration of 3.25% for producing grain-oriented silicon steel sheets were decarburization-annealed, coated with a water slurry of an annealing separator mainly composed of alumina, dried, and then final annealed at 1,200° C. for 20 h. in a dry hydrogen atmosphere. Thus, the grain-oriented silicon steel sheets having completed secondary recrystallization and having specular gloss and little inorganic mineral materials on the surfaces were obtained. One of the steel sheets (invented sample) was brushed with a brush coated with silicon carbide abrasive grains, while the other (comparative sample) was not. Subsequently, the steel sheets underwent a heat treatment at 800° C. in a 30%-nitrogen and 70%-hydrogen atmosphere with a dew point of −2° C. to form external oxidation type oxide films. Thereafter, a liquid mixture composed of 50 ml aqueous solution containing aluminum phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 9 shows the results.

TABLE 9

| Pretreatment condition Brushing with brush containing abrasive grains | Sectional observation result: Average film thickness (nm) | Sectional observation result: Particulate oxide area percentage (%) | Coating film adhesiveness: Film retention area percentage (%) | Coating film adhesiveness: Evaluation | Remarks |
|---|---|---|---|---|---|
| Not applied | 10 | 1 | 90 | X | Comparative sample |
| Applied | 13 | 21 | 95 | ○ | Invented sample |

From Table 9, the invented sample, which is brushed with the brush coated with abrasive grains and has a particulate oxide area percentage of 21% and a film retention area percentage of 95%, is superior in the adhesiveness to the coating film to the comparative sample, which is not brushed with the brush coated with abrasive grains and has a particulate oxide area percentage of 1% and a film retention area percentage of 90%.

EXAMPLE 4

Cold-rolled steel sheets 0.23 mm in thickness having a Si concentration of 3.30% for producing grain-oriented silicon steel sheets were decarburization-annealed, coated with a water slurry of an annealing separator mainly composed of magnesia, dried, and then final annealed at 1,200° C. for 20 h. in a dry hydrogen atmosphere. The films mainly composed of forsterite were formed on the surfaces of the grain-oriented silicon steel sheets produced through the above processes and having completed secondary recrystallization. Subsequently, the steel sheets were pickled in a mixed solution bath of ammonium fluoride and sulfuric acid for dissolving and removing the surface films and, then, chemically polished in a mixed solution of hydrofluoric acid and hydrogen peroxide. Thus, steel sheets free of inorganic mineral materials and having specular gloss at the surfaces were obtained.

One of the steel sheets (invented sample) was blasted with alumina powder for creating micro-strain at the surfaces, while the other (comparative sample) was not. Subsequently, the steel sheets underwent a heat treatment at 1,050° C. in a 50%-nitrogen and 50%-hydrogen atmosphere with a dew point of −8° C. to form external oxidation type oxide films. Thereafter, a liquid mixture composed of 100 ml aqueous solution containing dispersed colloidal alumina of 10% concentration, monolithic alumina powder of 10 g, boric acid of 5 g and water of 200 ml was applied to the steel sheets and baked at 900° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 10 shows the results.

TABLE 10

| Pretreatment condition Brushing with brush containing abrasive grains | Sectional observation result: Average film thickness (nm) | Sectional observation result: Particulate oxide area percentage (%) | Coating film adhesiveness: Film retention area percentage (%) | Coating film adhesiveness: Evaluation | Remarks |
|---|---|---|---|---|---|
| Not applied | 75 | 1 | 90 | X | Comparative sample |
| Applied | 86 | 30 | 95 | ○ | Invented sample |

From Table 10, the invented sample, which is subjected to the alumina powder blasting to create the strain at the surfaces and has a particulate oxide area percentage of 30% and a film retention area percentage of 95%, is superior in the adhesiveness of the coating film to the comparative sample which is not subjected to the alumina powder blasting and has a particulate oxide area percentage of 1% and a film retention area percentage of 90%.

(Heating Rate and Metal Oxides)

EXAMPLE 5

Cold-rolled steel sheets 0.225 mm in thickness having a Si concentration of 3.35% for producing grain-oriented silicon steel sheets were decarburization-annealed, coated with a water slurry of an annealing separator mainly composed of magnesia and bismuth chloride, dried, and then final annealed at 1,200° C. for 20 h. in a dry hydrogen atmosphere. Thus, the grain-oriented silicon steel sheets having completed secondary recrystallization and having little inorganic mineral materials on the surfaces were obtained. Subsequently, the steel sheets underwent a heat treatment at 1,150° C. in a 25%-nitrogen and 75%-hydrogen atmosphere with a dew point of −20° C. to form external oxidation type oxide films mainly composed of silica. Here, one of the steel sheets (invented sample) was heated at a heating rate of 65° C./sec. during the heating stage, while the other (comparative sample) was heated at 8° C./sec. Thereafter, a liquid mixture composed of 50 ml aqueous solution containing magnesium phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the insulating coating films was evaluated in terms of the film retention area percentage after winding the steel sheets around a cylinder 20 mm in diameter. Table 11 shows the results.

TABLE 11

| Heating rate (° C./sec.) | Film thickness (nm) | Cross-sectional area percentage of metallic oxides (%) | Film retention area percentage (%) | Remarks |
|---|---|---|---|---|
| 65 | 221 | 10 | 100 | Invented sample |
| 8 | 204 | 60 | 90 | Comparative sample |

From Table 11, the invented sample, which is heated at the heating rate of 65° C./sec. and has a metal oxide at the cross-sectional area percentage of 10% and a film retention area percentage of 100%, is superior in the adhesiveness to the coating film to the comparative sample, which is heated at the heating rate of 8° C./sec. and has a metal oxide at the cross-sectional area percentage of 60% and a film retention area percentage of 90%.

EXAMPLE 6

Cold-rolled steel sheets 0.225 mm in thickness having a Si concentration of 3.25% for producing grain-oriented silicon steel sheets were decarburization-annealed, coated with a water slurry of an annealing separator mainly composed of alumina, dried, and then final annealed at 1,200° C. for 20 h. in a dry hydrogen atmosphere. Thus, the grain-oriented silicon steel sheets, having completed secondary recrystallization and having specular gloss and with little inorganic mineral materials on the surfaces, were obtained. Subsequently, the steel sheets underwent a heat treatment at 800° C. in a 25%-nitrogen and 75%-hydrogen atmosphere with a dew point of −15° C. to form external oxidation type oxide films. Here, one of the steel sheets (invented sample) was heated at a heating rate of 35° C./sec. during the heating stage, while the other (comparative sample) was heated at 4° C./sec. Thereafter, a liquid mixture composed of 50 ml aqueous solution containing aluminum phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 12 shows the results.

TABLE 12

| Heating rate (° C./sec.) | Film thickness (nm) | Cross-sectional area percentage of metal oxides (%) | Film retention area percentage (%) | Remarks |
|---|---|---|---|---|
| 35 | 14 | 15 | 100 | Invented sample |
| 4 | 12 | 55 | 90 | Comparative sample |

From Table 12, the invented sample, which is heated at the heating rate of 35° C./sec. and has a metal oxide at the cross-sectional area percentage of 15% and a film retention area percentage of 100%, is superior in the adhesiveness to the coating film to the comparative sample, which is heated at the heating rate of 4° C./sec. and has a metal oxide at the cross-sectional area percentage of 55% and a film retention area percentage of 90%.

EXAMPLE 7

Cold-rolled steel sheets 0.225 mm in thickness having a Si concentration of 3.30% for producing grain-oriented silicon steel sheets were decarburization-annealed and, then, pickled in a mixed solution bath of ammonium fluoride and sulfuric acid for dissolving and removing surface oxide layers. Thereafter, the steel sheets were coated with alumina powder by the electrostatic coating method and then final annealed at 1,200° C. for 20 h. in a dry hydrogen atmosphere. Thus, the grain-oriented silicon steel sheets produced through the above processes and having completed secondary recrystallization were free of inorganic mineral materials and had specular gloss on the surfaces. Subsequently, the steel sheets underwent a heat treatment at 900° C. in a 25-nitrogen and 75%-hydrogen atmosphere with a dew point of −5° C. to form external oxidation type oxide films. Here, one of the steel sheets (invented sample) was heated at a heating rate of 90° C./sec. during the heating stage, while the other (comparative sample) was heated at 7° C./sec. Thereafter, a liquid mixture composed of 50 ml aqueous solution containing magnesium/aluminum phosphate of 50% concentration, 66 ml aqueous solution containing dispersed colloidal silica of 30% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 13 shows the results.

TABLE 13

| Heating rate (° C./sec.) | Film thickness (nm) | Cross-sectional area percentage of metal oxides (%) | Film retention area percentage (%) | Remarks |
|---|---|---|---|---|
| 90 | 25 | 5 | 100 | Invented sample |
| 7 | 28 | 60 | 90 | Comparative sample |

From Table 13, the invented sample, which is heated at the heating rate of 90° C./sec. and has a metal oxide at the cross-sectional area percentage of 5% and a film retention area percentage of 100%, is superior in the adhesiveness to the coating film to the comparative sample, which is heated at the heating rate of 7° C./sec. and has a metal oxide at the cross-sectional area percentage of 60% and a film retention area percentage of 90%.

EXAMPLE 8

Cold-rolled steel sheets 0.23 mm in thickness having a Si concentration of 3.30% for producing grain-oriented silicon steel sheets were decarburization-annealed, coated with a water slurry of an annealing separator mainly composed of magnesia, dried, and then final annealed at 1,200° C. for 20 h. in a dry hydrogen atmosphere. The films mainly composed of forsterite were formed on the surfaces of the grain-oriented silicon steel sheets produced through the above processes and having completed secondary recrystallization. Subsequently, the steel sheets were pickled in a mixed solution bath of ammonium fluoride and sulfuric acid for dissolving and removing the surface films and, then, chemically polished in a mixed solution of hydrofluoric acid and hydrogen peroxide. Thus, the steel sheets free of inorganic mineral materials and having specular gloss on the surfaces were obtained. Subsequently, the steel sheets underwent a heat treatment at 1,050° C. in a 25%-nitrogen and 75%-hydrogen atmosphere with a dew point of 0° C. to form external oxidation type oxide films. Here, one of the steel sheets (invented sample) was heated at a heating rate of 250° C./sec. during the heating stage, while the other (comparative sample) was heated at 6° C./sec. Thereafter, a liquid mixture composed of 100 ml aqueous solution containing dispersed colloidal alumina of 10% concentration, monolithic alumina powder of 10 g, boric acid of 5 g and water of 200 ml was applied to the steel sheets thus prepared and baked at 900° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 14 shows the results.

TABLE 14

| Heating rate (° C./sec.) | Film thickness (nm) | Cross-sectional area percentage of metal oxides (%) | Film retention area percentage (%) | Remarks |
|---|---|---|---|---|
| 250 | 82 | 10 | 100 | Invented sample |
| 6 | 75 | 55 | 90 | Comparative sample |

From Table 14, it can be seen that the invented sample, which is heated at the heating rate of 250° C./sec. and has a metal oxide sectional area percentage of 10% and a film retention area percentage of 100%, is superior in the adhesiveness to the coating film to the comparative sample, which is heated at the heating rate of 6° C./sec. and has a metal oxide at the cross-sectional area percentage of 55% and a film retention area percentage of 90%.

(Cooling Rate and Voids)

EXAMPLE 9

Cold-rolled steel sheets 0.225 mm in thickness having a Si concentration of 3.35% for producing grain-oriented silicon steel sheets were decarburization-annealed, coated with a water slurry of an annealing separator mainly composed of magnesia and bismuth chloride, dried, and then final annealed at 1,200° C. for 20 h. in a dry hydrogen atmosphere. Thus, the grain-oriented silicon steel sheets having completed secondary recrystallization and having little inorganic mineral materials on the surfaces were obtained. Subsequently, the steel sheets underwent a heat treatment at 1,150° C. in a 25%-nitrogen and 75%-hydrogen atmosphere with a dew point of −20° C. to form external oxidation type oxide films mainly composed of silica. Here, one of the steel sheets (invented sample) was cooled at a cooling rate of 10° C./sec., while the other (comparative sample) was cooled at 200° C./sec. Thereafter, a liquid mixture composed of 50 ml aqueous solution containing magnesium phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the insulating coating films was evaluated in terms of the film retention area percentage after winding the steel sheets around a cylinder 20 mm in diameter. Table 15 shows the results.

TABLE 15

| Cooling rate (° C./sec.) | Film thickness (nm) | Area percentage of voids (%) | Film retention area percentage (%) | Remarks |
|---|---|---|---|---|
| 10 | 218 | 15 | 100 | Invented sample |
| 200 | 205 | 40 | 90 | Comparative sample |

From Table 15, the invented sample, which is cooled at the cooling rate of 10° C./sec. and has a void area percentage of 15% and a film retention area percentage of 100%, is superior in the adhesiveness to the coating film to the comparative sample, which is cooled at the cooling rate of 200° C./sec. and has a void area percentage of 40% and a film retention area percentage of 90%.

EXAMPLE 10

Cold-rolled steel sheets 0.225 mm in thickness having a Si concentration of 3.25% for producing grain-oriented silicon steel sheets were decarburization-annealed, coated with a water slurry of an annealing separator mainly composed of alumina, dried, and then final annealed at 1,200° C. for 20 h. in a dry hydrogen atmosphere. Thus, the grain-oriented silicon steel sheets having completed secondary recrystallization and having specular gloss and little inorganic mineral materials on the surfaces were obtained. Subsequently, the steel sheets underwent a heat treatment at 800° C. in a 25%-nitrogen and 75%-hydrogen atmosphere with a dew point of −10° C. to form external oxidation type oxide films. Here, one of the steel sheets (invented sample) was cooled at a cooling rate of 5° C./sec., while the other (comparative sample) was cooled at 150° C./sec. Thereafter, a liquid mixture composed of 50 ml of an aqueous solution containing aluminum phosphate of 50% concentration, 100 ml of an aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 16 shows the results.

TABLE 16

| Cooling rate (° C./sec.) | Film thickness (nm) | Area percentage of voids (%) | Film retention area percentage (%) | Remarks |
|---|---|---|---|---|
| 5 | 14 | 25 | 100 | Invented sample |
| 150 | 12 | 35 | 90 | Comparative sample |

From Table 16, the invented sample, which is cooled at the cooling rate of 5° C./sec. and has a void area percentage of 25% and a film retention area percentage of 100%, is superior in the adhesiveness to the coating film to the comparative sample, which is cooled at the cooling rate of 150° C./sec. and has a void area percentage of 35% and a film retention area percentage of 90%.

EXAMPLE 11

Cold-rolled steel sheets 0.225 mm in thickness having a Si concentration of 3.30% for producing grain-oriented silicon steel sheets were decarburization-annealed and, then, pickled in a mixed solution bath of ammonium fluoride and sulfuric acid for dissolving and removing surface oxide layers. Thereafter, the steel sheets were coated with alumina powder by the electrostatic coating method and then final annealed at 1,200° C. for 20 h. in a dry hydrogen atmosphere. Thus, the grain-oriented silicon steel sheets produced through the above processes and having completed secondary recrystallization were free of inorganic mineral materials and had specular gloss on the surfaces. Subsequently, the steel sheets underwent a heat treatment at 900° C. in a 25%-nitrogen and 75%-hydrogen atmosphere with a dew point of −15° C. to form external oxidation type oxide films. Here, one of the steel sheets (invented sample) was cooled at a cooling rate of 50° C./sec., and the other (comparative sample) was cooled at 200° C./sec. Thereafter, a liquid mixture composed of 100 ml of an aqueous solution containing dispersed colloidal alumina of 10% concentration, monolithic alumina powder of 10 g, boric acid of 5 g and water of 200 ml was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 17 shows the results.

TABLE 17

| Cooling rate (° C./sec.) | Film thickness (nm) | Area percentage of voids (%) | Film retention area percentage (%) | Remarks |
|---|---|---|---|---|
| 50 | 25 | 15 | 100 | Invented sample |
| 200 | 23 | 40 | 90 | Comparative sample |

From Table 17, the invented sample, which is cooled at the cooling rate of 50° C./sec. and has a void area percentage of 15% and a film retention area percentage of 100%, is superior in the adhesiveness to the coating film to the comparative sample, which is cooled at the cooling rate of 200° C./sec. and has a void area percentage of 40% and a film retention area percentage of 90%.

EXAMPLE 12

Cold-rolled steel sheets 0.23 mm in thickness having a Si concentration of 3.30% for producing grain-oriented silicon steel sheets were decarburization-annealed, coated with a water slurry of an annealing separator mainly composed of magnesia, dried, and then final annealed at 1,200° C. for 20 h. in a dry hydrogen atmosphere. The films mainly composed of forsterite were formed on the surfaces of the grain-oriented silicon steel sheets produced through the above processes and having completed secondary recrystallization. Subsequently, the steel sheets were pickled in a mixed solution bath of ammonium fluoride and sulfuric acid for dissolving and removing the surface films and, then, were chemically polished in a mixed solution of hydrofluoric acid and hydrogen peroxide. Thus, the steel sheets free of inorganic mineral materials and having specular gloss on the surfaces were obtained. Subsequently, the steel sheets underwent a heat treatment at 1,050° C. in a 25%-nitrogen and 75%-hydrogen atmosphere with a dew point of 0° C. to form external oxidation type oxide films. Here, one of the steel sheets (invented sample) was cooled at a cooling rate of 100° C./sec., and the other (comparative sample) was cooled at 250° C./sec. Thereafter, a liquid mixture composed of 100 ml of an aqueous solution containing dispersed colloidal alumina of 10% concentration, monolithic alumina powder of 10 g, boric acid of 5 g and water of 200 ml was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 18 shows the results.

TABLE 18

| Cooling rate (° C./sec.) | Film thickness (nm) | Area percentage of voids (%) | Film retention area percentage (%) | Remarks |
|---|---|---|---|---|
| 100 | 82 | 10 | 100 | Invented sample |
| 250 | 75 | 35 | 90 | Comparative sample |

From Table 18, the invented sample, which is cooled at the cooling rate of 100° C./sec. and has a void area percentage of 10% and a film retention area percentage of 100%, is superior in the adhesiveness to the coating film to the comparative sample, which is cooled at the cooling rate of 250° C./sec. and has a void area percentage of 35% and a film retention area percentage of 90%.

(Dew Point of Cooling Atmosphere and Metallic Iron)

EXAMPLE 13

Cold-rolled steel sheets 0.23 mm in thickness having a Si concentration of 3.30% for producing grain-oriented silicon steel sheets were decarburization-annealed, coated with a water slurry of an annealing separator mainly composed of magnesia, dried, and then final annealed at 1,200° C. for 20 h. in a dry hydrogen atmosphere. The films mainly composed of forsterite were formed on the surfaces of the grain-oriented silicon steel sheets produced through the above processes and had complete secondary recrystallization. Subsequently, the steel sheets were pickled in a mixed solution bath of ammonium fluoride and sulfuric acid for dissolving and removing the surface films and, then, were chemically polished in a mixed solution of hydrofluoric acid and hydrogen peroxide. Thus, the steel sheets free of inorganic mineral materials and having specular gloss on the surfaces were obtained. Subsequently, the steel sheets underwent a heat treatment at 1,050° C. in a 25%-nitrogen and 75%-hydrogen atmosphere with a dew point of 0° C. to form external oxidation type oxide films. Here, one of the steel sheets (invented sample) was cooled in a 100%-nitrogen cooling atmosphere with a dew point of 15° C., and the other (comparative sample) was cooled in the same cooling atmosphere but with a dew point of 65° C. Thereafter, a liquid mixture composed of 100 ml aqueous solution containing dispersed colloidal alumina of 10% concentration, monolithic alumina powder of 10 g, boric acid of 5 g and water of 200 ml was applied to the steel sheets thus prepared and baked at 900° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 19 shows the results.

TABLE 19

| Dew point of cooling atmosphere (° C.) | Film thickness (nm) | Cross-sectional area percentage of metallic iron (%) | Film retention area percentage (%) | Remarks |
|---|---|---|---|---|
| 15 | 72 | 20 | 100 | Invented sample |
| 65 | 85 | 40 | 90 | Comparative sample |

From Table 19, the invented sample, which is cooled in the atmosphere with the dew point of 15° C. and has a metallic iron area percentage of 20% and a film retention area percentage of 100%, is superior in the adhesiveness to the coating film to the comparative sample, which is cooled in the atmosphere with the dew point of 65° C. and has a metallic iron area percentage of 40% and a film retention area percentage of 90%.

EXAMPLE 14

Cold-rolled steel sheets 0.225 mm in thickness having a Si concentration of 3.25% for producing grain-oriented silicon steel sheets were decarburization-annealed, coated with a water slurry of an annealing separator mainly composed of alumina, dried, and then final annealed at 1,200° C. for 20 h. in a dry hydrogen atmosphere. Thus, the grain-oriented silicon steel sheets having completed secondary recrystallization and having specular gloss and little inorganic mineral materials on the surfaces were obtained. Subsequently, the steel sheets underwent a heat treatment at 800° C. in a 25%-nitrogen and 75%-hydrogen atmosphere with a dew point of −10° C. to form external oxidation type oxide films. Here, one of the steel sheets (invented sample) was cooled in a 90%-nitrogen and 10%-hydrogen cooling atmosphere with a dew point of 35° C., and the other (comparative sample) was cooled in the same cooling atmosphere but with a dew point of 70° C. Thereafter, a liquid mixture composed of 50 ml aqueous solution containing aluminum phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 20 shows the results.

TABLE 20

| Dew point of cooling atmosphere (° C.) | Film thickness (nm) | Cross-sectional area percentage of metallic iron (%) | Film retention area percentage (%) | Remarks |
|---|---|---|---|---|
| 35 | 15 | 15 | 100 | Invented sample |
| 70 | 13 | 35 | 90 | Comparative sample |

From Table 20, the invented sample, which is cooled in the atmosphere with the dew point of 350° C. and has a metallic iron at the cross-sectional area percentage of 15% and a film retention area percentage of 100%, is superior in the adhesiveness to the coating film to the comparative sample, which is cooled in the atmosphere with the dew point of 70° C. and has a metallic iron at the cross-sectional area percentage of 35% and a film retention area percentage of 90%.

EXAMPLE 15

Cold-rolled steel sheets 0.225 mm in thickness having a Si concentration of 3.30% for producing grain-oriented silicon steel sheets were decarburization-annealed and, then, pickled in a mixed solution of ammonium fluoride and sulfuric acid for dissolving and removing surface oxide layers. Thereafter, the steel sheets were coated with alumina powder by the electrostatic coating method and then final annealed at 1,200° C. for 20 h. in a dry hydrogen atmosphere. Thus, the grain-oriented silicon steel sheets produced through the above processes and having completed secondary recrystallization were free of inorganic mineral materials and had specular gloss on the surfaces. Subsequently, the steel sheets underwent a heat treatment at 900° C. in a 25%-nitrogen and 75%-hydrogen atmosphere with a dew point of −15° C. to form external oxidation type oxide films. Here, one of the steel sheets (invented sample) was cooled in a 50%-nitrogen and 50%-hydrogen cooling atmosphere with a dew point of 50° C., and the other (comparative sample) was cooled in the same cooling atmosphere but with a dew point of 65° C. Thereafter, a liquid mixture composed of 50 ml of an aqueous solution containing magnesium/aluminum phosphate of 50% concentration, 66 ml aqueous solution containing dispersed colloidal silica of 30% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 21 shows the results.

TABLE 21

| Dew point of cooling atmosphere (° C.) | Film thickness (nm) | Cross-sectional area percentage of metallic iron (%) | Film retention area percentage (%) | Remarks |
|---|---|---|---|---|
| 50 | 26 | 25 | 100 | Invented sample |
| 65 | 27 | 35 | 90 | Comparative sample |

From Table 21, the invented sample, which is cooled in the atmosphere with the dew point of 50° C. and has a metallic iron at the cross-sectional area percentage of 25% and a film retention area percentage of 100%, is superior in the adhesiveness to the coating film to the comparative sample, which is cooled in the atmosphere with the dew point of 65° C. and has a metallic iron at the cross-sectional area percentage of 35% and a film retention area percentage of 90%.

EXAMPLE 16

Cold-rolled steel sheets 0.225 mm in thickness having a Si concentration of 3.35% for producing grain-oriented silicon steel sheets were decarburization-annealed, coated with a water slurry of an annealing separator mainly composed of magnesia and bismuth chloride, dried, and then final annealed at 1,200° C. for 20 h. in a dry hydrogen atmosphere. Thus, the grain-oriented silicon steel sheets having completed secondary recrystallization and having little inorganic mineral materials on the surfaces were obtained. Subsequently, the steel sheets underwent a heat treatment at 1,150° C. in a 25%-nitrogen and 75%-hydrogen atmosphere with a dew point of −20° C. to form external oxidation type oxide films mainly composed of silica. Here, one of the steel sheets (invented sample) was cooled in a 100%-nitrogen cooling atmosphere with a dew point of 5° C., and the other (comparative sample) was cooled in the same cooling atmosphere but with a dew point of 65° C. Thereafter, a liquid mixture composed of 50 ml aqueous solution containing magnesium phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films.

With regard to the grain-oriented silicon steel sheets prepared through the above processes and having the insulating coating films, the adhesiveness to the insulating coating films was evaluated in terms of the film retention area percentage after winding the steel sheets around a cylinder 20 mm in diameter. Table 22 shows the results.

TABLE 22

| Dew point of cooling atmosphere (° C.) | Film thickness (nm) | Cross-sectional area percentage of metallic iron (%) | Film retention area percentage (%) | Remarks |
|---|---|---|---|---|
| 5 | 208 | 5 | 100 | Invented sample |
| 65 | 215 | 45 | 90 | Comparative sample |

From Table 22, the invented sample, which is cooled in the atmosphere with the dew point of 50° C. and has a metallic iron at the cross-sectional area percentage of 5% and a film retention area percentage of 100%, is superior in the adhesiveness to the coating film to the comparative sample, which is cooled in the atmosphere with the dew point of 65° C. and has a metallic iron at the cross-sectional area percentage of 45% and a film retention area percentage of 90%.

(Contact Time with Application Liquid and Low-Density Layer)

EXAMPLE 17

Cold-rolled steel sheets 0.225 mm in thickness having a Si concentration of 3.30% for producing grain-oriented silicon steel sheets were decarburization-annealed and, then, pickled in a mixed solution bath of ammonium fluoride and sulfuric acid for dissolving and removing surface oxide layers. Thereafter, the steel sheets were coated with alumina powder by the electrostatic coating method and then final annealed at 1,200° C. for 20 h. in a dry hydrogen atmosphere. Thus, the grain-oriented silicon steel sheets produced through the above processes and having completed secondary recrystallization were free of inorganic mineral materials and had specular gloss on the surfaces. Subsequently, the steel sheets underwent a heat treatment at 900° C. in a 25%-nitrogen and 75%-hydrogen atmosphere with a dew point of −3° C. to form external oxidation type oxide films. Thereafter, a liquid mixture composed of 50 ml of an aqueous solution containing magnesium/aluminum phosphate of 50% concentration, 66 ml aqueous solution containing dispersed colloidal silica of 30% concentration and chromic anhydride of 5 g was applied to the steel sheets thus prepared and baked at 850° C. for 30 sec. to form tension-creating insulating coating films. Here, the contact time of one of the steel sheets (invented sample) with the application liquid while the temperature was 100° C. or lower was 3 sec., and that of the other (comparative sample) was 35 sec.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 23 shows the results.

TABLE 23

| Contact time (sec.) | Film thickness (nm) | Low-density layer ratio (%) | Film retention area percentage (%) | Remarks |
|---|---|---|---|---|
| 3 | 23 | 5 | 100 | Invented sample |

TABLE 23-continued

| Contact time (sec.) | Film thickness (nm) | Low-density layer ratio (%) | Film retention area percentage (%) | Remarks |
|---|---|---|---|---|
| 35 | 24 | 40 | 90 | Comparative sample |

From Table 23, the invented sample, whose contact time with the application liquid is 3 sec., having a low-density layer ratio of 5% and a film retention area percentage of 100%, is superior in the adhesiveness to the coating film to the comparative sample, whose contact time with the application liquid is 35 sec., having a low-density layer ratio of 40% and a film retention area percentage of 90%.

EXAMPLE 18

Cold-rolled steel sheets 0.225 mm in thickness having a Si concentration of 3.35% for producing grain-oriented silicon steel sheets were decarburization-annealed, coated with a water slurry of an annealing separator mainly composed of magnesia and bismuth chloride, dried, and then final annealed at 1,200° C. for 20 h. in a dry hydrogen atmosphere. Thus, the grain-oriented silicon steel sheets having completed secondary recrystallization and having little inorganic mineral materials on the surfaces were obtained. Subsequently, the steel sheets underwent a heat treatment at 1,150° C. in a 25%-nitrogen and 75%-hydrogen atmosphere with a dew point of −15° C. to form external oxidation type oxide films mainly composed of silica. Thereafter, a liquid mixture composed of 50 ml of an aqueous solution containing magnesium phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films. Here, the contact time of one of the steel sheets (invented sample) with the application liquid while the temperature was 100° C. or lower was 10 sec., and that of the other (comparative sample) was 25 sec.

With regard to the grain-oriented silicon steel sheets prepared through the above processes and having the insulating coating films, the adhesiveness to the insulating coating films was evaluated in terms of the film retention area percentage after winding the steel sheets around a cylinder 20 mm in diameter. Table 24 shows the results.

TABLE 24

| Contact time (sec.) | Film thickness (nm) | Low-density layer ratio (%) | Film retention area percentage (%) | Remarks |
|---|---|---|---|---|
| 10 | 223 | 10 | 100 | Invented sample |
| 25 | 210 | 35 | 90 | Comparative sample |

From Table 24, the invented sample, whose contact time with the application liquid is 10 sec., having a low-density layer ratio of 10% and a film retention area percentage of 100%, is superior in the adhesiveness to the coating film to the comparative sample, whose contact time with the application liquid is 25 sec., having a low-density layer ratio of 35% and a film retention area percentage of 90%.

EXAMPLE 19

Cold-rolled steel sheets 0.225 mm in thickness having a Si concentration of 3.25% for producing grain-oriented silicon steel sheets were decarburization-annealed, coated with a water slurry of an annealing separator mainly composed of alumina, dried, and then final annealed at 1,200° C. for 20 h. in a dry hydrogen atmosphere. Thus, the grain-oriented silicon steel sheets having completed secondary recrystallization and having specular gloss and little inorganic mineral materials on the surfaces were obtained. Subsequently, the steel sheets underwent a heat treatment at 800° C. in a 30%-nitrogen and 70%-hydrogen atmosphere with a dew point of −10° C. to form external oxidation type oxide films. Thereafter, a liquid mixture composed of 50 ml of an aqueous solution containing aluminum phosphate of 50% concentration, 100 ml aqueous solution containing dispersed colloidal silica of 20% concentration and chromic anhydride of 5 g was applied to the steel sheets thus prepared and baked at 850° C. for 30 sec. to form tension-creating insulating coating films. Here, the contact time of one of the steel sheets (invented sample) with the application liquid while the temperature was 100° C. or lower was 1 sec., and that of the other (comparative sample) was 40 sec.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 25 shows the results.

TABLE 25

| Contact time (sec.) | Film thickness (nm) | Low-density layer ratio (%) | Film retention area percentage (%) | Remarks |
|---|---|---|---|---|
| 1 | 13 | 5 | 100 | Invented sample |
| 40 | 11 | 35 | 90 | Comparative sample |

From Table 25, the invented sample, whose contact time with the application liquid is 1 sec., having a low-density layer ratio of 5% and a film retention area percentage of 100%, is superior in the adhesiveness to the coating film to the comparative sample, whose contact time with the application liquid is 40 sec., having a low-density layer ratio of 35% and a film retention area percentage of 90%.

EXAMPLE 20

Cold-rolled steel sheets 0.23 mm in thickness having a Si concentration of 3.30% for producing grain-oriented silicon steel sheets were decarburization-annealed, coated with a water slurry of an annealing separator mainly composed of magnesia, dried, and then final annealed at 1,200° C. for 20 h. in a dry hydrogen atmosphere. The films mainly composed of forsterite were formed on the surfaces of the grain-oriented silicon steel sheets produced through the above processes and having completed secondary recrystallization. Subsequently, the steel sheets were pickled in a mixed solution bath of ammonium fluoride and sulfuric acid for dissolving and removing the surface films and, then, chemically polished in a mixed solution of hydrofluoric acid and hydrogen peroxide. Thus, the steel sheets free of inorganic mineral materials and having specular gloss on the surfaces were obtained. Subsequently, the steel sheets underwent a heat treatment at 1,050° C. in a 50%-nitrogen and 50%-hydrogen atmosphere with a dew point of −10° C. to form external oxidation type oxide films. Thereafter, a liquid mixture composed of 100 ml aqueous solution containing dispersed colloidal alumina of 10% concentration, monolithic alumina powder of 10 g, boric acid of 5 g and water of 200 ml was applied to the steel sheets thus prepared and baked at 900° C. for 30 sec. to form tension-creating insulating coating films. Here, the contact time of one of the steel sheets (invented sample) with the application liquid was 0.5 sec., and that of the other (comparative sample) was 50 sec.

With regard to the grain-oriented silicon steel sheets prepared through the above processes and having the insulating coating films, the adhesiveness to the coating films was evaluated in terms of the film retention area percentage after winding the steel sheets around a cylinder 20 mm in diameter. Table 26 shows the results.

TABLE 26

| Contact time (sec.) | Film thickness (nm) | Low-density layer ratio (%) | Film retention area percentage (%) | Remarks |
|---|---|---|---|---|
| 0.5 | 76 | 1 | 100 | Invented sample |
| 50 | 81 | 35 | 90 | Comparative sample |

From Table 26, the invented sample, whose contact time with the application liquid is 0.5 sec., having a low-density layer ratio of 1% and a film retention area percentage of 100%, is superior in the adhesiveness to the coating film to the comparative sample, whose contact time with the application liquid is 50 sec., having a low-density layer ratio of 35% and a film retention area percentage of 90%.

INDUSTRIAL APPLICABILITY

The present invention makes it possible to obtain a grain-oriented silicon steel sheet having good adhesiveness of tension-creating insulating coating films even to a final annealed steel sheet without inorganic mineral films.

What is claimed is:

1. A grain-oriented silicon steel sheet excellent in adhesiveness to tension-creating insulating coating films formed on the grain-oriented silicon steel sheet produced by removing inorganic mineral coating films composed of forsterite and so on with pickling or the like or by deliberately preventing the formation thereof, characterized by: having, at the interface between each of the tension-creating insulating coating films and the steel sheet, an external oxidation type membranous oxide film of 2 to 500 nm in average thickness mainly composed of amorphous silica and/or a mixed oxide film consisting of external oxidation type membranous oxide film of 2 to 500 nm in average thickness mainly composed of amorphous silica and particulate oxides mainly composed of amorphous silica: and satisfying any one or more of the following requirements A to E;

A. that the percentage of said particulate oxides to said membranous oxide film is 2% or more in terms of area percentage at a cross-section;

B. that the percentage of oxides composed of one or more elements selected from among Fe, Al, Ti, Mn and Cr in said membranous oxide film is 50% or less in terms of area percentage at a cross-section;

C. that the percentage of voids in said membranous oxide film is 30% or less in terms of area percentage at a cross-section;

D. that the percentage of metallic iron in said membranous oxide film is 30% or less in terms of area percentage at a section; and E. that the average thickness of low-density layers is 30% or less of the total thickness of said membranous oxide film when they are evaluated in terms of the ratio between elastic scattering strength and inelastic scattering strength measured by electron energy loss spectroscopy.

2. A grain-oriented silicon steel sheet excellent in adhesiveness to tension-creating insulating coating films according to claim 1, characterized in that the tension-creating insulating coating films are the coating films formed by baking an application liquid mainly composed of phosphate and colloidal silica and/or an application liquid mainly composed of alumina sol and boric acid.

3. A method for producing a grain-oriented silicon steel sheet excellent in adhesiveness to tension-creating insulating coating films formed by, in advance of the formation of the tension-creating insulating coating films: annealing a final annealed grain-oriented silicon steel sheet produced by removing the inorganic mineral coating films composed of forsterite, and so on, by pickling or the like or by deliberately preventing the formation thereof in a low-oxidizing atmosphere to form oxides on the surfaces thereof; then applying a liquid for forming the tension-creating insulating coating films; and baking the application liquid: characterized by satisfying any one or more of the following requirements A to E:

A. to form particulate oxides mainly composed of amorphous silica in addition to external oxidation type membranous oxide films of 2 to 500 nm in average thickness mainly composed of amorphous silica by imposing micro-strains and/or forming micro-roughnesses on the surfaces of the steel sheet prior to the annealing in a low-oxidizing atmosphere for forming the oxides, and then annealing the steel sheet in a low-oxidizing atmosphere at a temperature from 600 to 1,150° C.;

B. to control the percentage of oxides composed of one or more elements selected from among Fe, Al, Ti, Mn and Cr in the external oxidation type oxide films mainly composed of amorphous silica to 50% or less in terms of area percentage at a section by controlling the heating rate to 10 to 500° C./sec. in a heating temperature range from 200 to 1,150° C., during the annealing process in a low-oxidizing atmosphere for forming the external oxidation type membranous oxide films and the particulate oxides;

C. to control the percentage of voids in the external oxidation type oxide films mainly composed of amorphous silica to 30% or less in terms of area percentage at a section by controlling the cooling rate to 100° C./sec. or less in a cooling temperature range from 1,150 to 200° C., during the annealing process in a low-oxidizing atmosphere for forming the external oxidation type oxide films and the particulate oxides;

D. to control the percentage of metallic iron in the external oxidation type oxide films mainly composed of amorphous silica to 30% or less in terms of area percentage at a section by controlling the dew point of the cooling atmosphere to 60° C. or lower in a cooling temperature range from 1,150 to 200° C., during the annealing process in a low-oxidizing atmosphere for forming the external oxidation type oxide films and the particulate oxides; and E. to control the average thickness of low-density layers to 30% or less of the total thickness of the external oxidation type oxide films mainly composed of amorphous silica, when they are evaluated in terms of the ratio between elastic scattering strength and inelastic scattering strength measured by electron energy loss spectroscopy, by controlling the time during which the application liquid for forming the tension-creating insulating coating films and the steel sheet with the amorphous silica contact each other to 20 sec. or less, in the temperature range of 100° C. or lower, in the method of forming the tension-creating insulating coating films by applying the liquid for forming the tension-creating insulating coating films and baking the application liquid.

4. A method for producing a grain-oriented silicon steel sheet excellent in adhesiveness to tension-creating insulating coating films according to claim 3, characterized by baking an application liquid mainly composed of phosphate and colloidal silica and/or an application liquid mainly composed of alumina sol and boric acid.

* * * * *